(12) United States Patent
Calisa

(10) Patent No.: US 7,595,833 B2
(45) Date of Patent: Sep. 29, 2009

(54) VISUALIZING CAMERA POSITION IN RECORDED VIDEO

(75) Inventor: Rajanish Calisa, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 478 days.

(21) Appl. No.: 11/362,193

(22) Filed: Feb. 27, 2006

(65) Prior Publication Data

US 2006/0195876 A1   Aug. 31, 2006

(30) Foreign Application Priority Data

Feb. 28, 2005   (AU) .............................. 2005200888

(51) Int. Cl.
*H04N 5/222* (2006.01)
*H04N 7/00* (2006.01)

(52) U.S. Cl. ................ 348/333.01; 348/36; 348/333.05

(58) Field of Classification Search .................. 348/36, 348/37, 42, 218.1, 239, 333.01, 333.02, 333.05, 348/333.11; 725/105
See application file for complete search history.

(56) References Cited

U.S. PATENT DOCUMENTS

| | | | |
|---|---|---|---|
| 6,043,837 A | 3/2000 | Driscoll, Jr. et al. | 348/36 |
| 6,356,297 B1 | 3/2002 | Cheng et al. | 348/36 |
| 6,414,716 B1 * | 7/2002 | Kawai | 348/211.3 |
| 6,466,254 B1 | 10/2002 | Furlan et al. | 348/36 |
| 6,563,528 B2 * | 5/2003 | Satoda | 348/14.05 |
| RE38,401 E | 1/2004 | Goldberg et al. | 715/720 |
| 6,697,105 B1 * | 2/2004 | Kato et al. | 348/211.6 |
| 7,218,352 B2 * | 5/2007 | Hasegawa et al. | 348/333.05 |
| 2004/0027453 A1 * | 2/2004 | Hasegawa et al. | 348/143 |
| 2004/0257436 A1 * | 12/2004 | Koyanagi et al. | 348/36 |

FOREIGN PATENT DOCUMENTS

EP   1359553   11/2003

OTHER PUBLICATIONS

Sep. 5, 2007 Australian Official Action in Australian Patent Appln. No. 20058200888.

* cited by examiner

*Primary Examiner*—Kelly L Jerabek
(74) *Attorney, Agent, or Firm*—Fitzpatrick, Cella, Harper & Scinto

(57) ABSTRACT

Disclosed is an arrangement (100) for displaying video footage captured by a controllable camera (103), the arrangement comprising a memory (107) storing the captured footage, means for constructing a representation (505) of a field of view accessible by the camera (103), means for retrieving, from the memory (107), the stored footage (503) and parameters characterising the control state of the camera (103) when the footage was captured, and means for displaying the footage (503), the representation (505) of the field of view, and an indicator (502) on the representation (505) dependent upon the parameters.

20 Claims, 29 Drawing Sheets

| Field | Length (in bytes) | Description |
|---|---|---|
| Pan | 2 | Pan angle in 1/100$^{th}$ of a degree units. |
| Tile | 2 | Tile angle in 1/100$^{th}$ of a degree units. |
| Zoom | 2 | Zoom angle in 1/100$^{th}$ of a degree units. |

Range of camera in 1/100$^{th}$ degree units
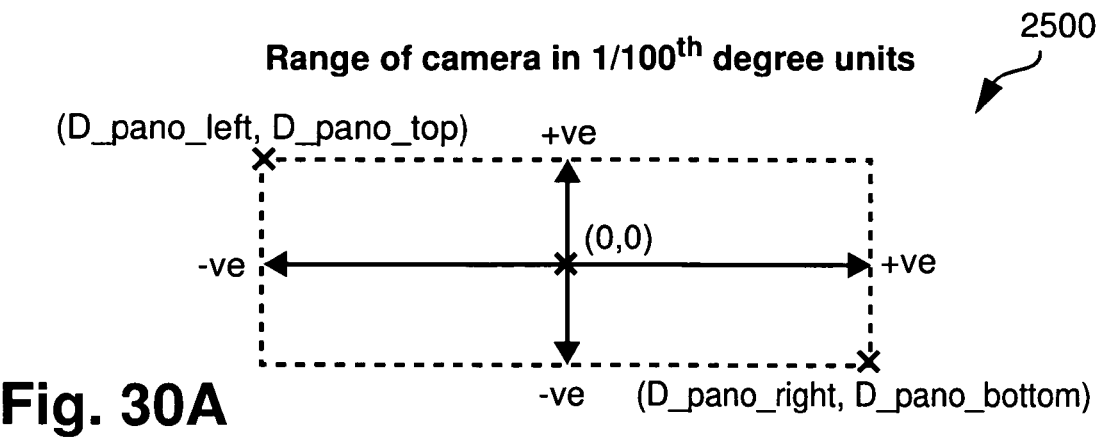
Fig. 30A
Image of co-ordinate system in pixel units
Fig. 30B
2-D Transformation from Camera to Image co-ordinate system
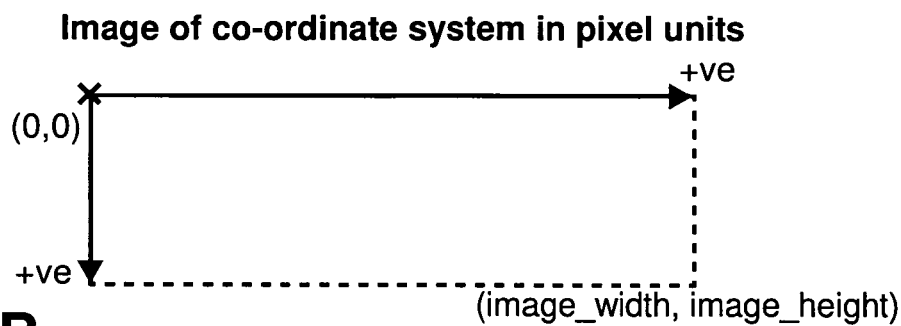
Fig. 30C
Fig. 30D

VISUALIZING CAMERA POSITION IN RECORDED VIDEO

FIELD OF THE INVENTION

The present invention relates generally to the area of video surveillance and, in particular, to visualizing, in the context of recorded video footage, the orientation of the viewpoint (i.e., the controllable camera) from which the footage was captured.

BACKGROUND

Many current surveillance and security systems use a number of controllable network cameras interconnected over an existing corporate local area network (LAN) or wide area network (WAN). The network cameras, also referred to as internet protocol (IP) cameras, typically incorporate special purpose computers. These IP cameras constitute nodes in a computer network, and can generally be remotely controlled and operated by a user from a suitable interconnected desktop computer. The controllable cameras generally have pan, tilt and zoom capability, and may also be controlled in regard to other camera attributes such as lens aperture, infra-red or night vision capability, and so on. By using a suitable software application running on their desktop computer, the user typically can control pan, tilt and zoom aspects of the controllable camera, and consequently, can receive and view live images from the camera over the controllable field of view that is accessible by the camera.

Video surveillance systems of this type typically generate very large amounts of data. Storage servers, which can be implemented using corresponding software applications running on desktop computers, can be used to record this video footage to non-volatile storage devices such as hard disk drives (HDDs).

SUMMARY

An arrangement is needed whereby large volumes of recorded surveillance data can be rapidly and conveniently viewed by the user. Furthermore, there is a particular need to visualize the control state of the camera capturing the data, where this control state relates most importantly, but not necessarily exclusively, to the orientation and zoom attributes of the camera as these attributes are associated to particular captured video footage. This enables the user to view the captured video footage and, equally importantly, to intuitively grasp the context of the viewed video within the accessible field of view of the camera.

Disclosed are arrangements, hereinafter referred to as arrangements for "viewpoint visualization", which seek to satisfy the above need by displaying the stored video footage in conjunction with a representation of the field of view accessible by the camera which captured the video footage, wherein upon the representation of the field of view, an "indicator" is superimposed to indicate the control state of the camera, this control state relating, in particular, to the pan/tilt/zoom parameters of the camera associated with the captured video material in question.

By this arrangement, referred to as the viewpoint visualization arrangement, the user can both review recorded video footage, and equally important, instantly gain an intuitive understanding of the viewpoint within the camera field of view from which the recorded footage was captured. The indicator depicting the camera orientation is automatically updated as and when the control states of the camera changes, in the preferred arrangement. Alternately, the indicator can be updated according to some other method, such as by generating and displaying an indicator which represents the average orientation of the camera over a desired time period. The accessible field of view of the camera is also referred to, in the present specification, as a "panorama" or a "panorama image".

In one arrangement, the panorama image is the complete extent of coverage of the camera in question The panorama image can be generated by stitching together non-overlapping images captured using different pan and tilt positions of the camera. In another arrangement, the panoramic image can be an artificially generated line representation of the field of view that is accessible by the camera.

The "indicator" that is superimposed upon the panoramic image is, in the preferred arrangement, implemented as a rectangle. The position of the rectangle within the panoramic image indicates the camera's pan and tilt position, and the size of the rectangle is an indication of the corresponding zoom setting of the camera. The indicator can take other forms, however, including an arrow, an arbitrary geometric shape (such as an ellipse or a polygon for example), an arbitrary mark (such as a cursor line for example), a portal (such as a shaded rectangle giving the impression of a portal through which the region of interest is viewed) and so on.

Another aspect of the viewpoint visualization technique is to use the panorama image in conjunction with a timeline to relate the camera coverage on the panorama image with an indication of a time period on the timeline. This enables a user to visualize the time period during which the camera was focused at a particular region.

Yet another aspect of the viewpoint visualization arrangements is to use the panorama image as a search tool and display the search results on a timeline. The user can typically specify a region of interest in the panorama and visualize one or more time period indications on the time line showing the time(s) during which the camera was pointing anywhere within the region specified by the user.

Yet another aspect of the viewpoint visualization arrangements is to use the timeline as a search tool and display the search results on the panorama image. The user can typically specify a region of interest on the timeline representing a time period and visualize one or more camera position indications on the panorama showing the positions the camera was in during the specified time period.

According to a first aspect of the present invention, there is provided a method for displaying one of a plurality of images stored in a storage server, the images having been captured by a controllable camera, the method comprising the steps of:

constructing a representation of a field of view accessible by the camera;

retrieving, from the storage server, the stored image and parameters characterising the control state of the camera when the image was captured; and displaying:
the retrieved image;
the representation; and
an indicator on the representation dependent upon the parameters.

According to another aspect of the present invention, there is provided an apparatus for displaying one of a plurality of images stored in a storage server, the images having been captured by a controllable camera, the apparatus comprising:

a storage server storing the plurality of images;
means for constructing a representation of a field of view accessible by the camera;

means for retrieving, from the memory, the stored image and parameters characterising the control state of the camera when the image was captured; and means for displaying:
the retrieved image;
the representation; and
an indicator on the representation dependent upon the parameters.

According to another aspect of the present invention, there is provided an apparatus for displaying one of a plurality of images stored in a storage server, the images having been captured by a controllable camera, the apparatus comprising:

a memory for storing a program; and
a processor for executing the program, said program comprising:

code for constructing a representation of a field of view accessible by the camera;

code for retrieving, from a memory, the stored image and parameters characterising the control state of the camera when the image was captured; and code for displaying:
the retrieved image;
the representation; and
an indicator on the representation dependent upon the parameters.

According to another aspect of the present invention, there is provided a computer program product including a computer readable medium having recorded thereon a computer program for directing a processor to execute a method for displaying one of a plurality of images stored by a storage server, the images having been captured by a controllable camera, said program comprising:

code for constructing a representation of a field of view accessible by the camera;

code for retrieving, from a memory, the stored image and parameters characterising the control state of the camera when the image was captured; and code for displaying:
the retrieved image;
the representation; and
an indicator on the representation dependent upon the parameters.

According to another aspect of the present invention, there is provided a computer program for directing a processor to execute a method for displaying one of a plurality of images stored on a storage server, the images having been captured by a controllable camera, said program comprising:

code for constructing a representation of a field of view accessible by the camera;

code for retrieving, from a memory, the stored image and parameters characterising the control state of the camera when the image was captured; and code for displaying:
the retrieved image;
the representation; and
an indicator on the representation dependent upon the parameters.

Other aspects of the invention are also disclosed.

BRIEF DESCRIPTION OF THE DRAWINGS

One or more embodiments of the present invention will now be described with reference to the drawings, in which:

FIG. 6 shows the fields in the JPEG header of the recorded frame which the Viewer Application extracts to visualize camera position and movement on the panorama image;

FIGS. 30A, 30B, 30C, and 30D show the camera coordinate system in 1/100th degree units, the panorama image coordinate system and simple 2-D transformation matrices to convert points in one system to another and vice-versa.

DETAILED DESCRIPTION INCLUDING BEST MODE

Figure 1:
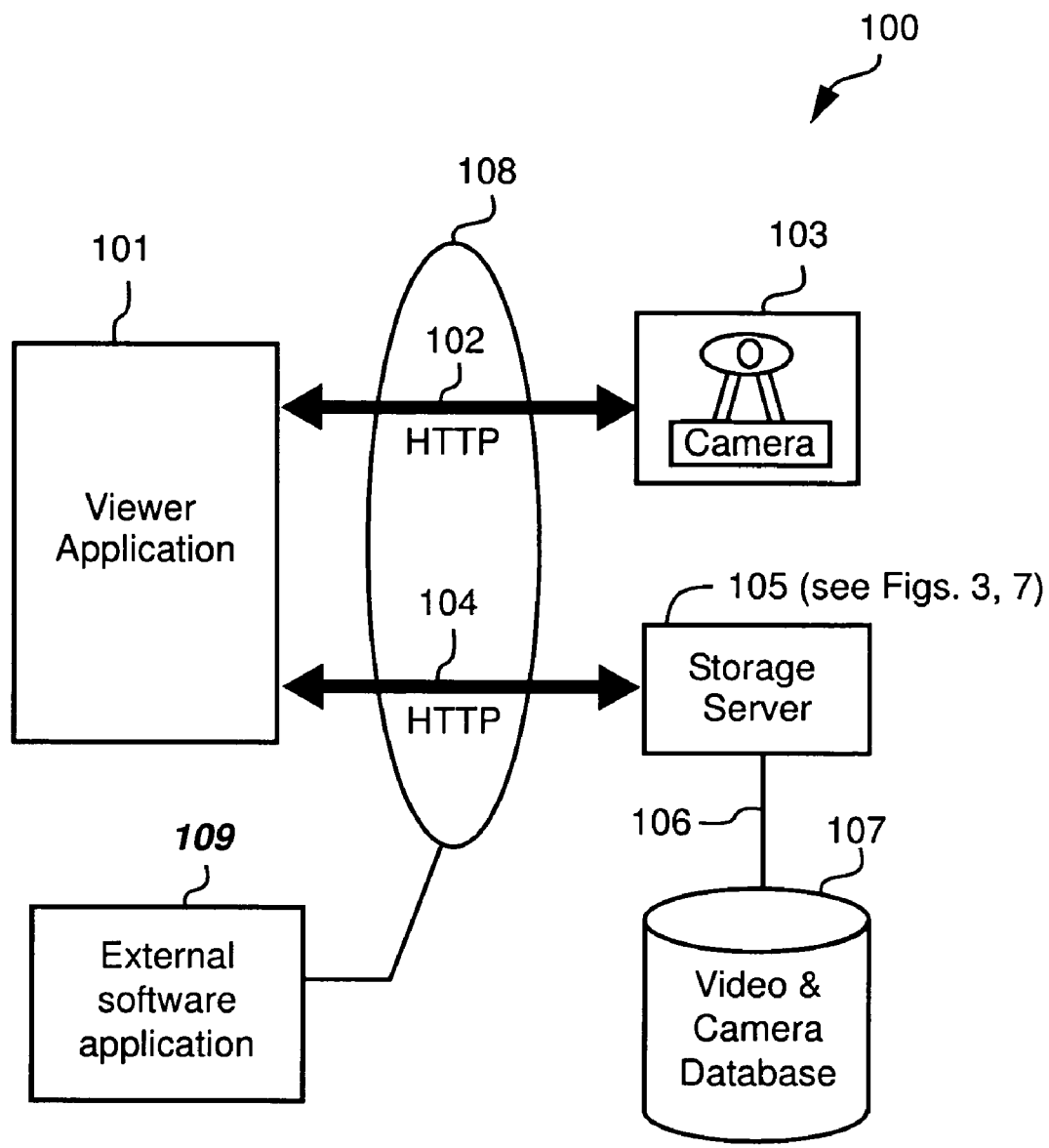
FIG. 1 is a system diagram which shows different components of a viewpoint visualization system.

Where reference is made in any one or more of the accompanying drawings to steps and/or features, which have the same reference numerals, those steps and/or features have for the purposes of this description the same function(s) or operation(s), unless the contrary intention appears.

Some portions of the description which follows are explicitly or implicitly presented in terms of algorithms and symbolic representations of operations on data within a computer memory. These representations are one way people skilled in data processing convey the substance of their work to others. An algorithm may be considered a self-consistent sequence of steps leading to a desired result. The steps can be those requiring physical manipulations of physical quantities. Usually, though not necessarily, these quantities may take the form of electrical or magnetic signals capable of being stored, transferred, combined, compared, and otherwise processed. It has proven convenient at times, principally for reasons of common usage, to refer to these signals as bits, values, elements, symbols, characters, terms, numbers, or the like.

Unless specifically stated otherwise, terms in the present specification such as "displaying", "constructing", "retrieving", "characterising", "capturing" "combining", and "outputting" refer to the actions and processes performed within a computer system, or similar electronic device. In particular, the computer system manipulates and transforms data represented as physical (electronic) quantities into other data. The data are stored within various registers and memories within the computer system.

The present specification also discloses apparatus for performing the operations of the viewpoint visualization methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of a more specialized apparatus to perform the required method steps may be appropriate. The structure of a conventional general purpose computer will appear from the description below.

In addition, the present invention also implicitly discloses a computer program, in that it would be apparent to the person skilled in the art that the individual steps of the preferred viewpoint visualization method described herein are to be put into effect by computer code which directs a processor to execute the viewpoint visualization method. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing the spirit or scope of the invention. Furthermore, one or more of the steps of the computer program may be performed in parallel rather than sequentially.

Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred viewpoint visualization method.

FIG. 1 is a functional system diagram which shows different components of a system 100. The system 100 comprises a Storage Server software Application 105 (also referred to as the storage server 105), one or more Viewer software Application instances 101 (also referred to as the viewer 101 or the viewer application 101), and one or more network cameras such as 103. Although the Storage Server Application 105 and the Viewer Server Application 101 are implemented in software in the described example, this is not intended to limit the implementation options, and hardware or hybrid hardware/software implementations can be used. The various components of the system 100 are connected to one another through a network 108. The system components communicate using a network protocol typically based on Hyper Text Transfer Protocol (HTTP) as depicted by arrows 102 and 104.

The camera 103 supported by the system 100 typically allows external software applications such as 109, 101 and 105 to control the camera 103, and to receive video signals captured by the camera 103 over the network using HTTP. The Storage Server software Application 105 and the Viewer software application 101 use HTTP to communicate with the camera 103 over the network 108. The Storage Server software Application 105 can store images captured from the camera 103 onto a video and camera database 107. The database 107 is a software entity that is effected on a suitable hardware platform, and may for example be effected as a suitable memory partition in a hard disk on a desktop computer 2726 (see FIG. 2) upon which the storage server application 105 runs. The video and camera database 107 in the described example comprises two components, namely a video database component which stores the video data captured by the camera 103, and a camera database which stores information identifying the camera 103 i.e., the name or label used to designate the camera 103), as well as IP address and port numbers by which the camera 103 is attached to the network 108. The video and camera database 107 is managed and maintained by the storage server 105.

The Storage Server Application 105 also provides access, for one or more Viewer Applications 101, to recorded video information stored on the database 107. The images captured by the camera 103 and stored on the database 107 are typically in Joint Photographic Experts Group (JPEG) format, however this is not intended to limit the types of formats which can be used. In this document, these images are typically referred to as JPEG images or JPEG frames. The Viewer Application 101 typically has a Graphical User Interface (GUI) enabling a user to view video footage stored on the database 107.

A sequence of JPEG frames is referred to as a video clip, or simply as video. A video clip can be logically segmented into sub-clips, each comprising a contiguous subset of the frames of the video clip based on one or more criteria such as camera position. The Viewer Application GUI is capable of viewing recorded images, recorded video clips, recorded video sub clips, and/or successive video sub clips.

As noted, the Viewer Application 101 typically communicates with the Storage Server Application 105 using HTTP. This communication is used by the Viewer Application 101 to learn which cameras such as 103 are known to the Storage Server Application 105, and to access video data recorded on the database 107 from the camera 103. The Viewer Application 101 enables a user of the system 100 to visualize the control state, in particular the orientation, that the camera 103 was in when a particular recorded image from that camera being viewed was captured. This is typically done in conjunction with a panorama image which may be either stored in a memory in the camera 103 or elsewhere. The orientation of the camera can be described in terms of the "control state" of the camera at the time the image was captured, where the control state is defined in terms, for example, of a time of capture of the image, a pan attribute, a tilt attribute, and a zoom attribute.

The panorama image represents the complete available range (also referred to as the field of view) accessible by the camera 103. The Storage Server 105 typically stores video data captured from the cameras 103 into flat files stored on a hard disk which may be located, for example, on a dedicated computer such as 2726 in FIG. 2. The recorded video database in 107 typically comprises video data files and video index files. The camera database in 107 is typically a file containing information about camera names, IP address and port numbers.

Figure 2:
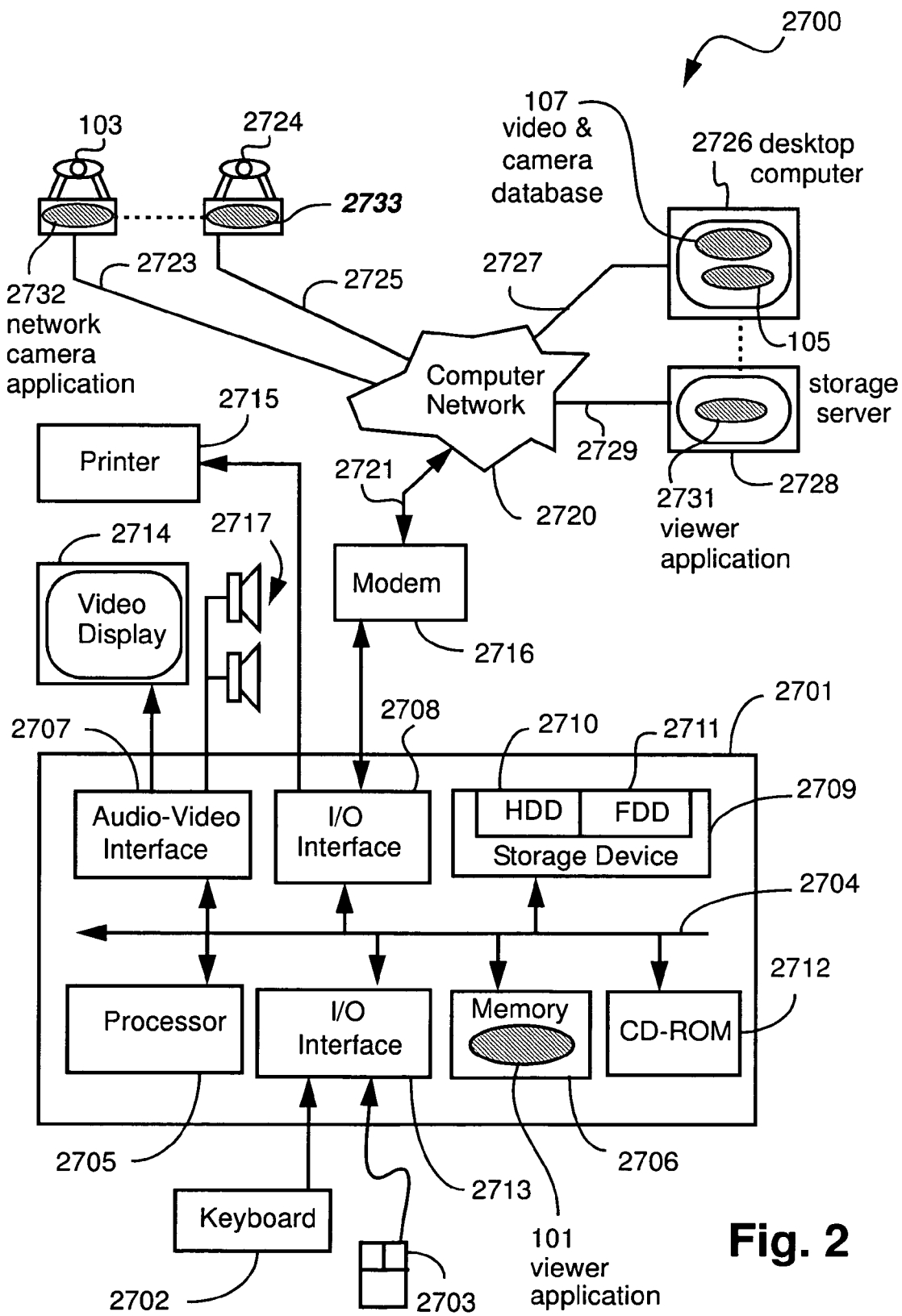
FIG. 2 is a schematic block diagram of a general-purpose computer upon which described methods for viewpoint visualization can be practiced.

FIG. 2 is a schematic block diagram of a computer system 2700, comprising general-purpose computers 2701, 2726 and 2728, and cameras 103, ..., 2724 (each of which includes a special purpose computer which is not explicitly shown in FIG. 2), upon which described methods for viewpoint visualization can be practiced. In this the method of viewpoint visualization particularly lends itself to implementation on the general-purpose computer system 2700, wherein the processes of FIGS. 7, 8, 10, 11, and 20-29 may be implemented as software, such as one or more application program modules executing within the computer system 2700. In particular, the steps of method of viewpoint visualization are effected by instructions in the software that are carried out by the computers in the system 2700.

The instructions may be formed as one or more code modules, each for performing one or more particular tasks. Some of the software modules may also be divided into two separate parts, in which a first part performs the viewpoint visualization methods and a second part manages a user interface between the first part and the user. The software modules may be stored in a computer readable medium, including the storage devices described below, for example. The software modules are loaded into the computers from the respective computer readable media, and then executed by the respective computers. A computer readable medium having such software or computer program recorded on it is a computer program product. The use of the computer program products in the computers of FIG. 2 preferably effects an advantageous apparatus for viewpoint visualization.

The computer system 2700 is formed by the computers 2701, 2728, and 2726, (as well as the hidden computers in the cameras 103 and 2724), input devices such as a keyboard 2702 and mouse 2703, output devices including a printer 2715, a display device 2714 and loudspeakers 2717. A Modulator-Demodulator (Modem) transceiver device 2716 is used by the computer 2701 for communicating to and from a communications network 2720, for example connectable via a telephone line 2721 or other functional medium. The modem 2716 can be used by the computer 2701 to obtain access, via the Internet, and other network systems, such as a Local Area Network (LAN) or a Wide Area Network (WAN), to the network 2720 and the devices/applications connected thereto. The modem 2716 may be incorporated into the computer 2701 in some implementations.

In the example of FIG. 2, the computer 2701 runs the viewer application 101 (shown running in the memory 2706), and the computer 2728 runs another viewer application 2731. The storage server application 105 runs on the computer 2726, upon which the video and camera database 107 is also located. The camera 103, upon which a network camera software application 2732 runs, and another camera 2724, upon which a network camera software application 2733 runs are also connected to the network 2720.

The computer 2701 typically includes at least one processor unit 2705, and the memory unit 2706, for example formed from semiconductor random access memory (RAM) and read only memory (ROM). The module 2701 also includes a number of input/output (I/O) interfaces including an audio-video interface 2707 that couples to the video display 2714 and loudspeakers 2717, an I/O interface 2713 for the keyboard 2702 and mouse 2703 and optionally a joystick (not illustrated), and an interface 2708 for the modem 2716 and printer 2715. In some implementations, the modem 2716 may be incorporated within the computer 2701, for example within the interface 2708. A storage device 2709 is provided and typically includes a hard disk drive 2710 and a floppy disk drive 2711. A magnetic tape drive (not illustrated) may also be used. A CD-ROM drive 2712 is typically provided as a non-volatile source of data. The components 2705 to 2713 of the computer 2701, typically communicate via an interconnected bus 2704 and in a manner which results in a conventional mode of operation of the computer 2701 known to those in the relevant art. Examples of computers on which the described arrangements can be practised include IBM-PC's and compatibles, Sun Sparcstations or alike computer systems evolved therefrom.

Typically, the viewer application program 101 is resident on the hard disk drive 2710 and is read and controlled in its execution by the processor 2705. Intermediate storage of the program and any data fetched from the network 2720 may be accomplished using the semiconductor memory 2706 (as shown in FIG. 2), possibly in concert with the hard disk drive 2710. In some instances, the viewer application program 101 may be supplied to the user encoded on a CD-ROM or floppy disk and read via the corresponding drive 2712 or 2711, or alternatively may be read by the user from the network 2720 via the modem device 2716. Still further, the software 101 can also be loaded into the computer 2701 from other computer readable media. The term "computer readable medium" as used herein refers to any storage or transmission medium that participates in providing instructions and/or data to the computer 2701 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer 2701. Examples of transmission media include radio or infra-red transmission channels as well as a network connection to another computer or networked device, and the Internet or Intranets including e-mail transmissions and information recorded on Websites and the like.

The method of viewpoint visualization may alternatively be implemented in dedicated hardware such as one or more integrated circuits performing the functions or sub functions of viewpoint visualization. Such dedicated hardware may include graphic processors, digital signal processors, or one or more microprocessors and associated memories.

Figure 3:
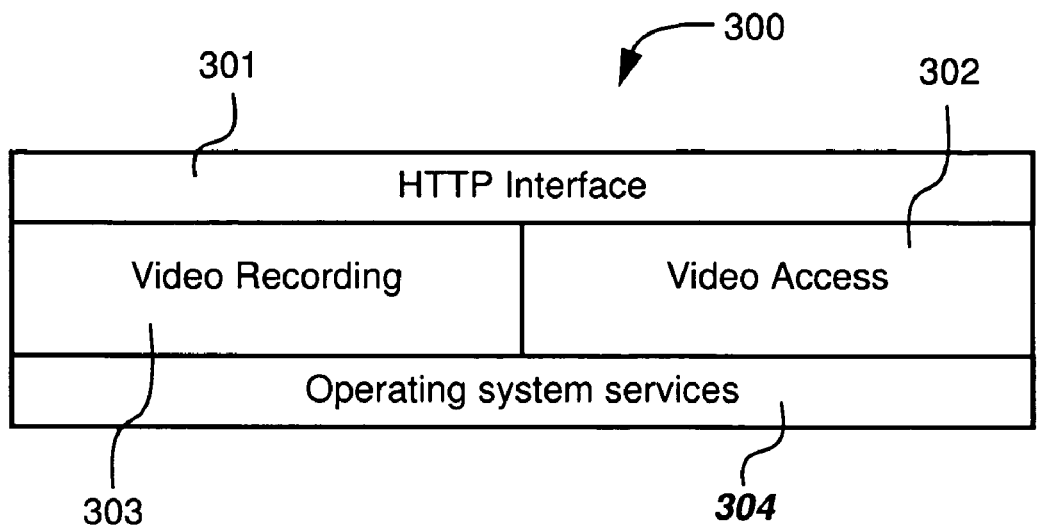
FIG. 3 is a layered architecture for the Storage Server Application.

FIG. 3 is an example 300 of a layered architecture for the Storage Server Application 105. The Storage Server Application 105 is typically implemented as a software program that runs on a desktop computer such as 2726 in FIG. 2 which is connected to other similar computers and network cameras through a computer network as shown in FIG. 2. The Storage Server Application 105 contains a web server implementation for handling HTTP requests from one or more Viewer Applications such as 101. The Storage Server Application depicted in FIG. 3 comprises four functional modules, namely;

A Video Access module 302;
A Video Recording module 303;
An HTTP Interface module 301; and
An Operating system services module 304.

The HTTP Interface module 301 is based upon the HTTP protocol. This module 301 serves as the external interface of the storage server 105, and is used to communicate with the Viewer Application 101. This interface module 301 implements a web server function which supports the HTTP protocol in handling requests from the Viewer Application 101. The interface module 301 implements the necessary functionality to handle the HTTP commands supported by the Storage Server 105. The HTTP requests received by the storage server application 105 via the interface module 301 are typically in the form of a URL having the following general form:

$$\text{http://<ip\_or\_host>:<port>/nvr/} \\ \text{<command>?<optional\_parameters>} \quad [1]$$

where the URL parameters in [1] are defined as follows:

Ip_or_host: IP address or host machine on which the Storage Server application 105 is running (such as the host machine 2726 in FIG. 2 upon which the Storage Server Application 105 is running).

Port: Port on which the Storage Server 105 is listening. Typically this value is port 80.

Command: The HTTP commands (being commands sent by the viewer application 101 to the storage server 105) supported by the Storage Server 105 are GetCameraList, GetVideo, GetAvailableVideo and GetCameraCoverage.

Figure 4:
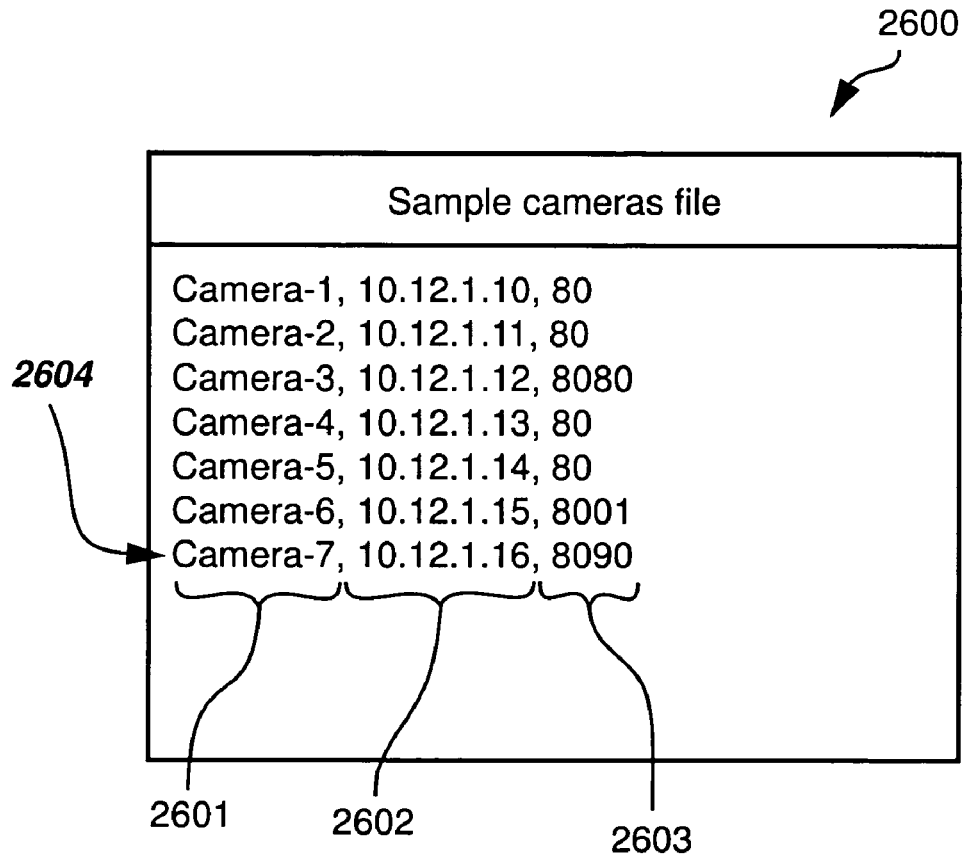
FIG. 4 shows a camera file used by the Storage Server Application.

The aforementioned commands have the following functionality:

GetCameraList: Command to get the list of cameras such as 103 known to the storage server 105. The storage server 105 returns a list of camera names and their network addresses in plain text format as shown in FIG. 4. Each line 2604 of the camera file 2600 in the response body contains a camera name 2601, its IP address 2602 and port number 2603, each field separated by a comma delimiter.

GetVideo: Command to get video from the storage server 105. This command is invoked using the parameters: camera_name and start_time. The camera_name is a string which is a unique name of the camera and start time is a date/time field specified using the following format: YYYY/MM/DD:HH:MM:SS, where YYYY is the year, MM is the month, DD is day of the month, HH is hour in the range 0-23, MM is minutes and SS is seconds. The response to this command from the storage sever 105 is a continuous stream of video frames sent as multi-part data in a HTTP response message. When there are no more frames to send back, the response is terminated and the HTTP connection is closed.

GetAvailableVideo: Command to get time periods where video is available for a given camera and a range of camera positions. The command is invoked using the parameters: camera_name and pan_tilt_range. The camera name is a string which uniquely identifies a camera and pan_tilt_range is a set of four integers typically delimited by a separator like the colon character. The first pair of integers specifies the range of pan positions in, say, $\frac{1}{100}^{th}$ degree units and the second pair of integers specifies the range of tilt positions in, say, $\frac{1}{100}^{th}$ degree units. The response to this command is a HTTP response message containing a list of time periods, in the body. Typically there will be one time period per line and each time period would be a pair of timestamps indicating start date and time and end date and time.

GetCameraCoverage: Command to get a list of pan, tilt and zoom positions of the camera, which indicates the various positions that the camera was in during a particular recording period. The command is invoked using the parameters: camera_name and time period. The camera name is a string which uniquely identifies a camera, and time period is specified as start_time and end_time which are specified using the following format: YYYY/MM/DD:HH:MM:SS, where YYYY is the year, MM is the month, DD is day of the month, HH is hour in the range 0-23, MM is minutes and SS is seconds. The response to this command is a list of pan, tilt and zoom positions of the camera, specified in camera coordinates. Typically there is one entry per line and each such line contains three integer values delimited by a suitable character such as a comma. These three integer values specify the pan, tilt and zoom values respectively.

The Video access module 302 deals with recorded video information, which is typically organized as a sequence of JPEG images in chronological order in one or more files in the database 107 (see FIGS. 1, 2). According to one arrangement, the aforementioned files comprise video data files such as 2201 in FIG. 5A and associated video index files such as 2203 in FIG. 5B. The respective filenames 2209 and 2210 of the video data file 2201 and the index file 2203 have camera name embedded in them, this forming the association between the recorded files 2201, 2203 and the corresponding camera with which the files were generated. Other file arrangements can also be used.

Figures 5A, 5B:
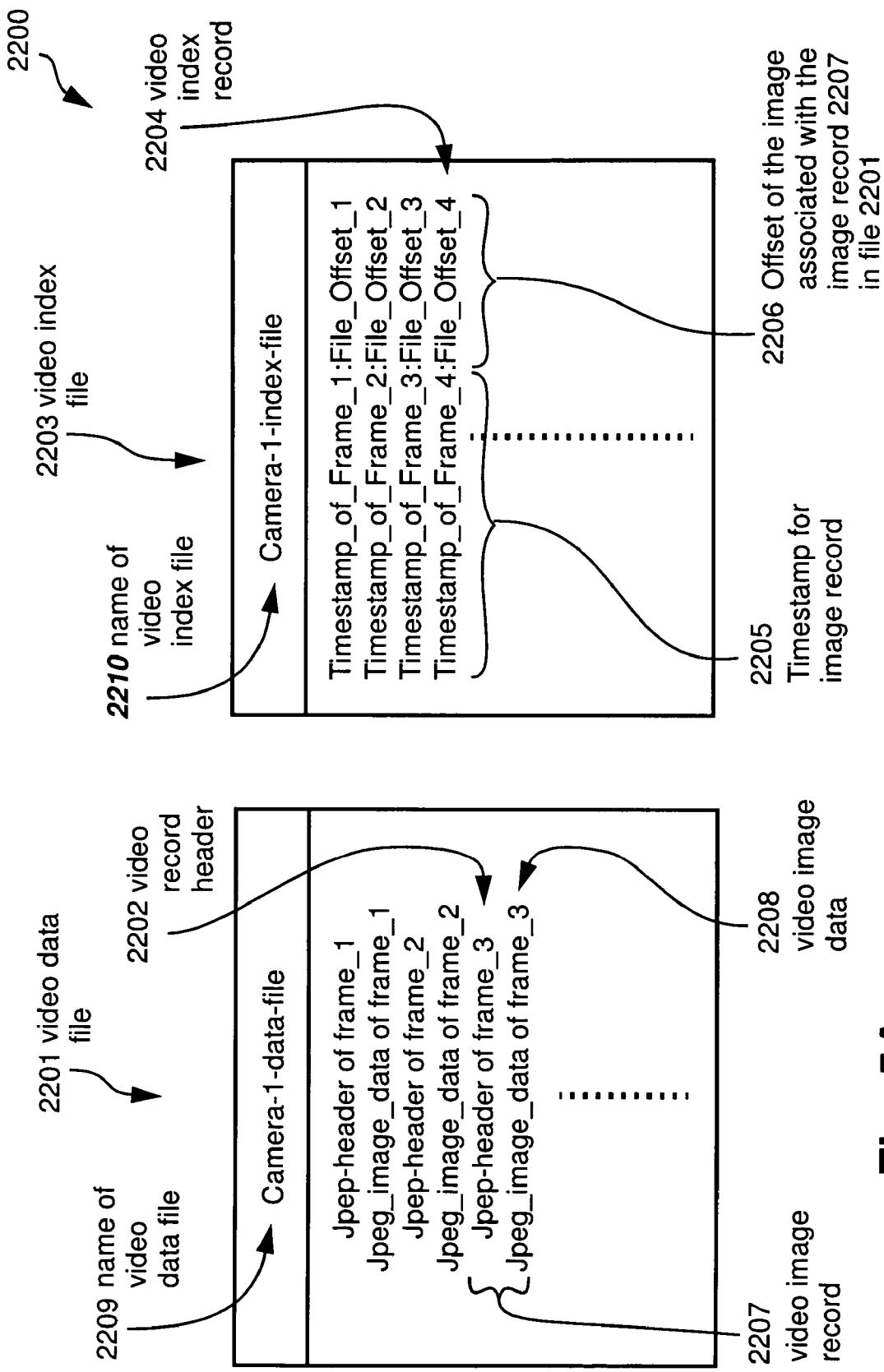
FIGS. 5A and 5B show the general format of the video data files and video index files used by the Storage Server Application.

The video index files such as 2203 provide a mechanism for fast access to the associated video data files such as 2201. These index files typically have one entry record (such as 2204) for every frame in the data file (also referred to as a video image record such as 2207). Each such entry 2204 typically contains a timestamp e.g., 2205 in FIG. 5B) which represents the time of image capture and a file offset e.g., 2206 in FIG. 5B) which is typically the location of the associated image in the video data file. The timestamps typically have at least millisecond precision. FIGS. 5A and 5B show respectively the format of the video data file and the format of the video index files. Each record 2207 for an image in the video data file 2201 has a header component (e.g., 2202 in FIG. 5B) which is typically a JPEG header, followed by an image data component (e.g., 2208 in FIG. 5B).

FIGS. 5A and 5B respectively show the general format of the video data file 2201 and the associated video index file 2203 used by the Storage Server Application 105. The video data file 2201 comprises video image records such as 2207 each of which comprises a video record header 2202 and associated video image data 2208. Associated with the image record 2207 is the video index record 2204 in the video index file 2203.

FIG. 5A shows the video data file 2201 which, in respect of the video image record 2207, stores the JPEG header 2202 containing at least pan, tilt and zoom (PTZ) settings of the camera when the video image data 2208 was captured, and also the video image data 2208 for the video image record 2207. The video frames captured from the network camera 103 and accessed through the Storage Server Application 105 contain additional information at least about the camera control state, including information about camera position expressed as the pan, tilt and zoom settings of the camera when the image was captured. This control state information is recorded in the JPEG header, and the beginning of the control state information is marked by a JPEG APP0 marker. This marker is a sequence of two bytes whose hexadecimal values are 0xFF and 0xE0. This marker is followed by a length field which is two bytes long. Following the length is the pan, tilt and zoom fields as described in FIG. 6. The segment length, pan, tilt and zoom values are stored in big-endian format.

FIG. 5B shows the video index file 2203 which, in relation to the image record 2207 in FIG. 5A, stores the image index record 2204 comprising a timestamp 2205 and a file offset field 2206, typically separated by a comma character or some other suitable delimiter. The offset field 2206 typically indicates the location of the 2208 image in the video data file 2201.

The Video Access module 302 provides the functionality necessary to open the video data file 2201 associated with a particular camera, based on the camera name in the filename 2209. Furthermore, the video access module 302 can "seek", i.e., can search for a particular frame such as 2207 in the video data file 2201, by searching the associated video index file 2203 on the basis of, for example, a particular start time/date stored in the corresponding video index record 2204. After completing the "seek" operation, the video access module can start retrieving the corresponding image frame such as 2208. The video index file 2203 is thus used to implement a particularly efficient seek mechanism. Once the video data file 2201 is opened, the user can retrieve video frames such as 2208 one at a time, until end of the file is reached.

FIG. 6 shows the fields in the JPEG header (such as 2202 in FIG. 5A) of the recorded frame (such as 2208 in FIG. 5A) which the Viewer Application 101 extracts in order to visualise camera position and movement on the panorama image.

Although the arrangement described in relation to FIGS. 5A, 5B and 6 stores PTZ parameters on a per image basis, other arrangements can equally be used. Thus, for example, information relating to N images can be stored as one information block, this information enabling PTZ parameters for each of the N images to be derived. This approach can be used, for example, if video information is stored in MPEG rather than JPEG format.

Returning to FIG. 3, the Video Recording module 303 implements the functionality of recording images from the network cameras such as 103 and storing the recorded images in video data files such as 2201. The corresponding video index files such as 2203 are also created and updated by this module 303.

The Operating system services module 304 is the Application Programming Interface (API) provided by the operating system or the platform (such as the computer 2276 in FIG. 2) on which the storage server application 105 runs. The various functional aspects of the Storage Server Application 105 are described in regard to the following figures.

Figure 7:
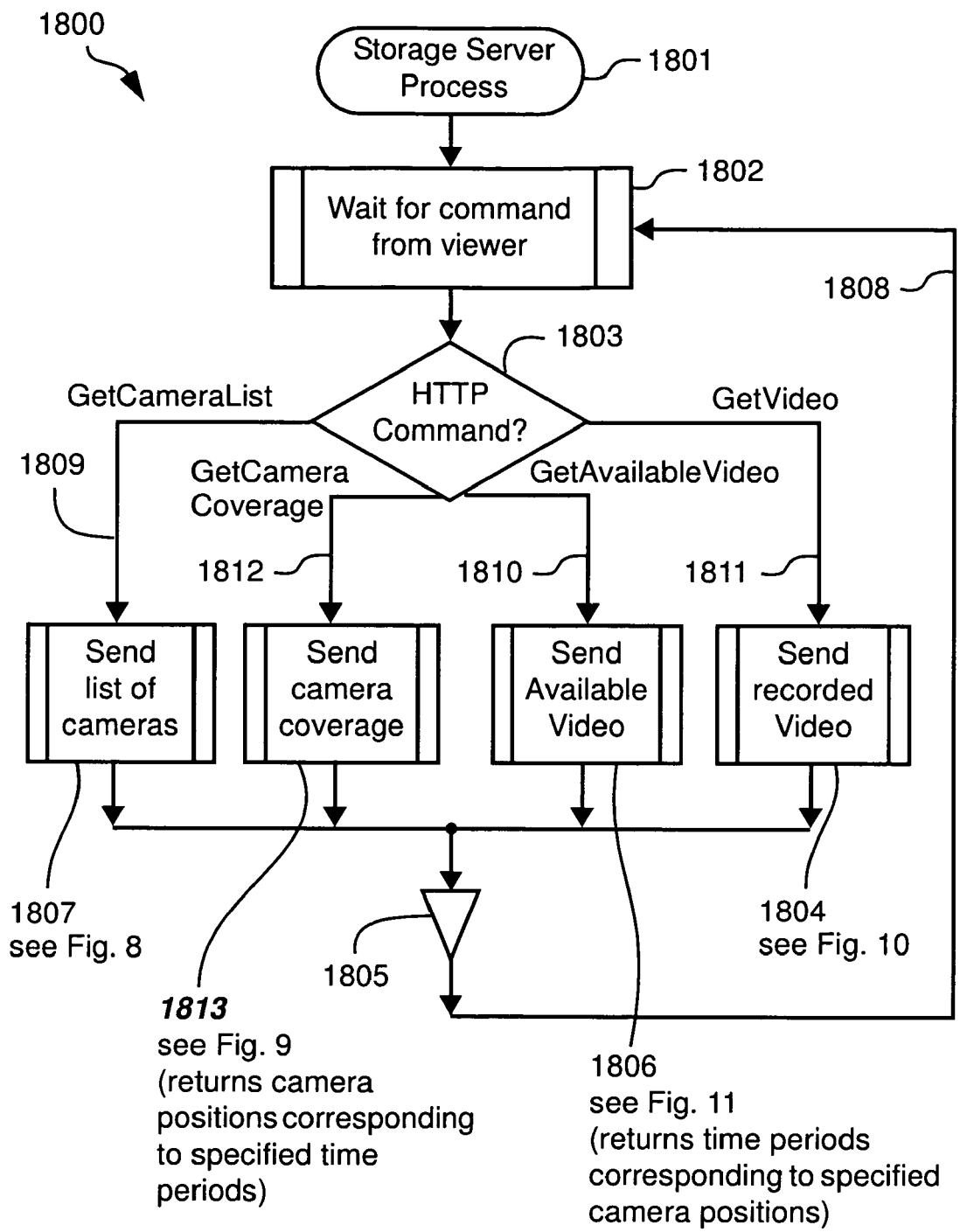
FIG. 7 is a process flowchart describing high level functions of the Storage Server Application.

FIG. 7 is a flowchart describing a high level process 1800 for the Storage Server Application 105. The process 1800 commences at 1801 which merely identifies the function of the process 1800, which is to receive the HTTP requests from the Viewer application 101, and to process the HTTP requests. A following step 1802 waits to receive commands from the viewer application 101. A following decision step 1803 processes the HTTP requests received from the Viewer Application 101 in order to determine which command has been received.

If the command is GetCameraList, then the process 1800 is directed from the step 1803 via an arrow 1809 to a step 1807 in which the storage server 105 returns a list of cameras stored by the storage server 105 in the video and camera database 107. This is described in detail in regard to FIG. 8. Returning to the step 1803, if the command is GetVideo, then the process 1800 follows an arrow 1811 to a step 1804 in which the storage server 105 returns recorded video from, for instance the video data file 2201, back to the Viewer Application 101. This is described in detail in regard to FIG. 10. Typically the Storage Server 105 starts a new thread to process GetVideo requests so that the storage server 105 can handle multiple requests from one or more Viewer Applications such as 101 concurrently.

Returning to the step 1803, if the command is GetAvailableVideo, then the process 1800 follows an arrow 1810 to a step 1806 in which the storage server 105 returns the time periods during which video was available for the specified range of camera positions. This is described in detail in regard to FIG. 11. Typically the storage server 105 starts a new thread to handle this command.

Returning to the step 1803, if the command is GetCameraCoverage, then the process 1800 follows an arrow 1812 to a step 1813 in which the storage server 105 returns a list of pan, tilt and zoom positions of the camera which indicates the various positions the camera was in during a particular recording period. Typically the storage server 105 starts a new thread to handle this command. This is described in more detail in regard to FIG. 9.

After commands are successfully processed in appropriate ones of the steps 1807, 1813, 1806 and 1804, the process 1800 is directed, as depicted by the symbol 1805, back to the step 1802 in which the Storage Server 105 waits for the next HTTP request from a Viewer Application.

Figure 8:
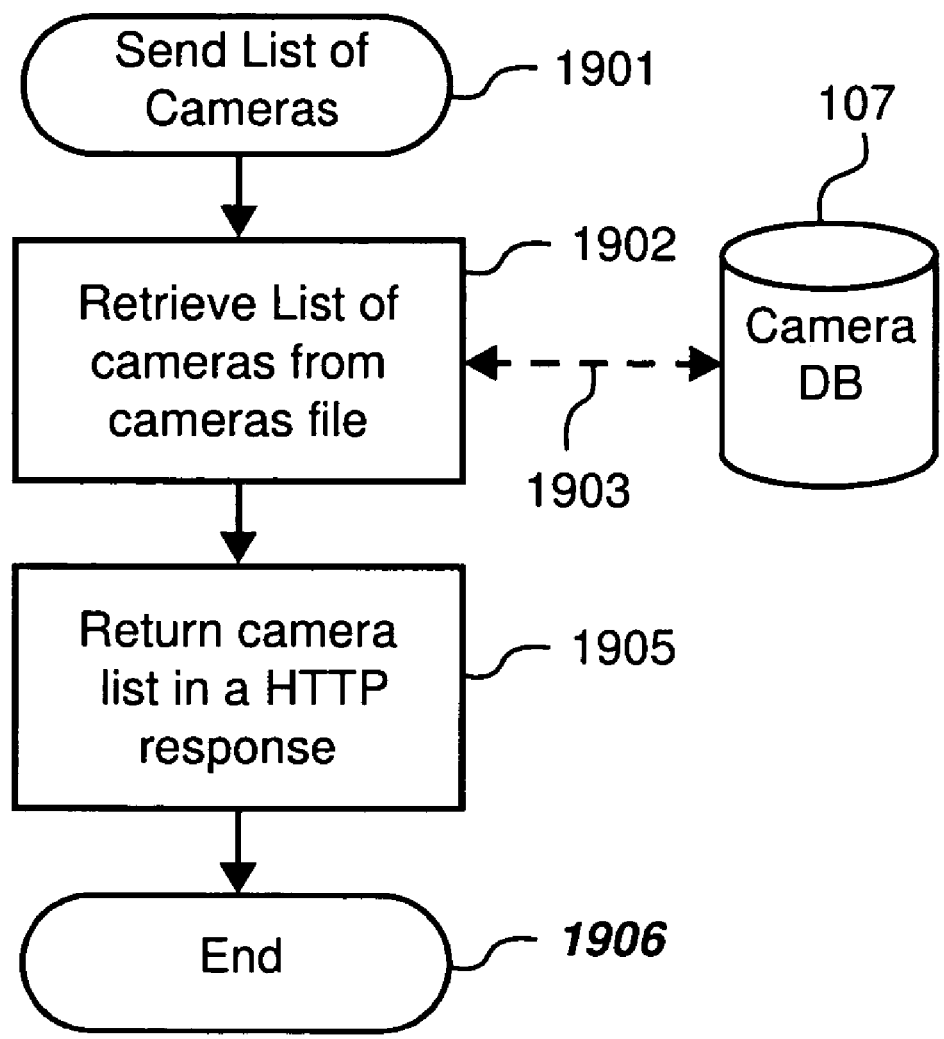
FIG. 8 shows a process flowchart for handling the GetCameraList command in the Storage server application as shown in FIG. 7.

FIG. 8 shows the process 1807 (from FIG. 7) for handling a GetCameraList command at 1809 by the Storage server application 105 in FIG. 7. In a first step 1901, the process 1807 (see FIG. 7) is called. In a following step 1902, the Storage Server 105 reads, as depicted by a dashed arrow 1903, the camera's file from the video and cameras database 107 on the computer 2726 which runs the storage server application 105. The storage server then creates a HTTP response message containing the information in the cameras file which is typically a list of camera names and their associated IP address and port numbers. A sample camera's file is shown in FIG. 4. In a following step 1905, the Storage server 105 returns the HTTP response back to the Viewer Application 101. The process 1807 then terminates at an END step 1906.

Figure 9:
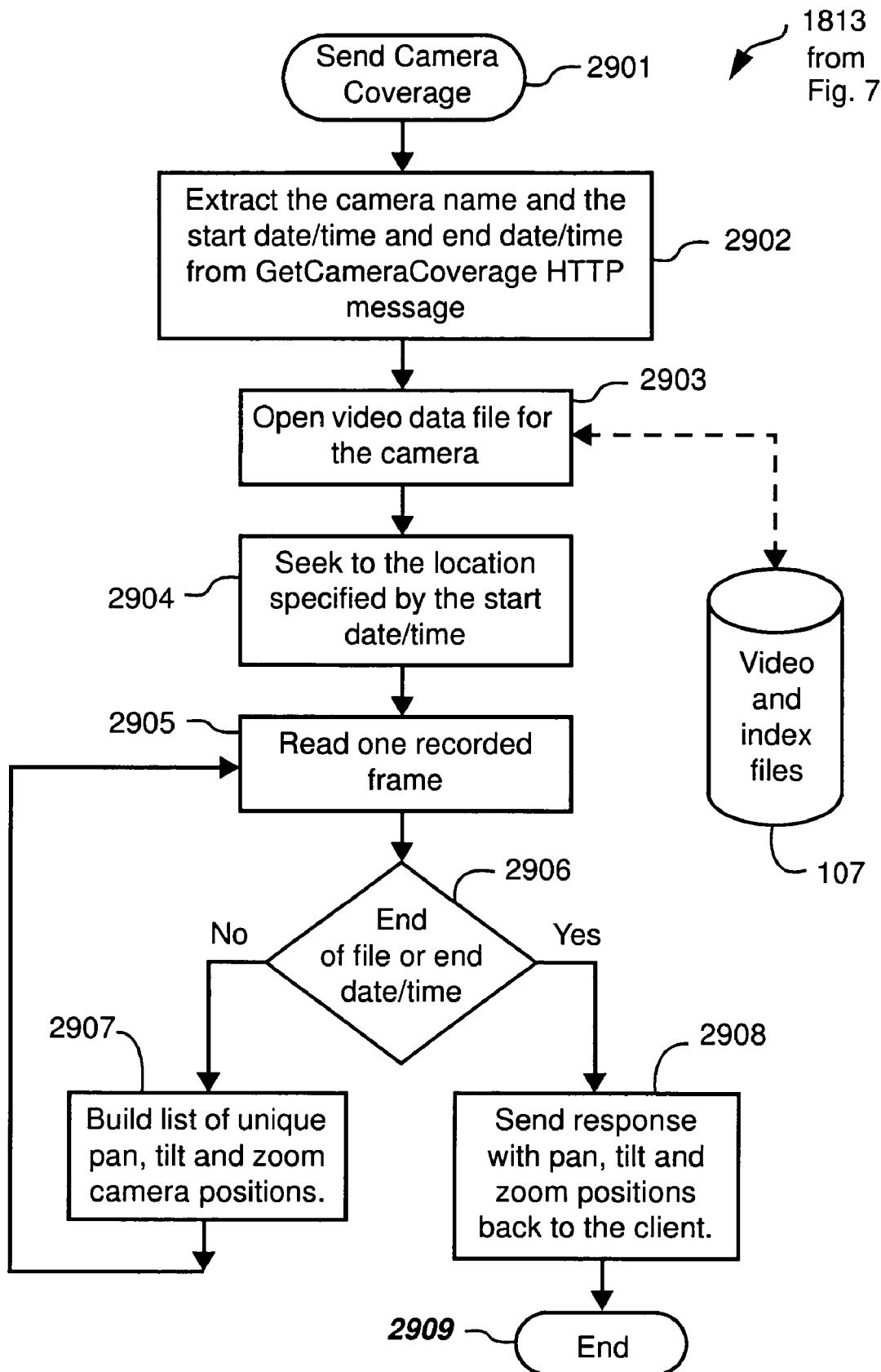
FIG. 9 is a process flowchart for handling the GetCameraCoverage command in the process of FIG. 7.

FIG. 9 is a flowchart of the process 1813 from FIG. 7 for handling the GetCameraCoverage process 1813. The process 1813 commences with a step 2901 in which the storage server 105 calls the process 1813, after which in a step 2902 the Storage Server 105 extracts camera name, start date/time, and end date/time information from the GetCameraCoverage HTTP message at 1812 (see FIG. 7). In a following step 2903 the storage server 105 opens the video data file and the corresponding video index file for the camera identified in the step 2902. In a following step 2904 the Storage Server 105 seeks to the location, in the video index file, specified by the start date and time extracted in the step 2902. The video index file is thus used to seek to the correct offset in the video data file based on the start date and time. In a following step 2905 the storage server 105 reads a recorded frame from the video data file. A following step 2906 determines if an end of file, or end date or end time has been detected. If this is not the case, then the process 1813 follows a NO arrow to a step 2907 in which the storage server 105 extracts the pan, tilt and zoom values associated with the frame read in the step 2905, and builds a list of pan, tilt and zoom values. The process 1813 is then directed back to the step 2905.

Returning to the step 2906, once the end of file is reached, or the end date/time is reached on the video file, the process 1813 is directed by a YES arrow to a step 2908 in which the storage server 105 sends the HTTP response back to the Viewer application 101. The response body is line oriented and contains one set of pan, tilt and zoom values per line. The process 1813 then terminates with an END step 2909.

Figure 10:
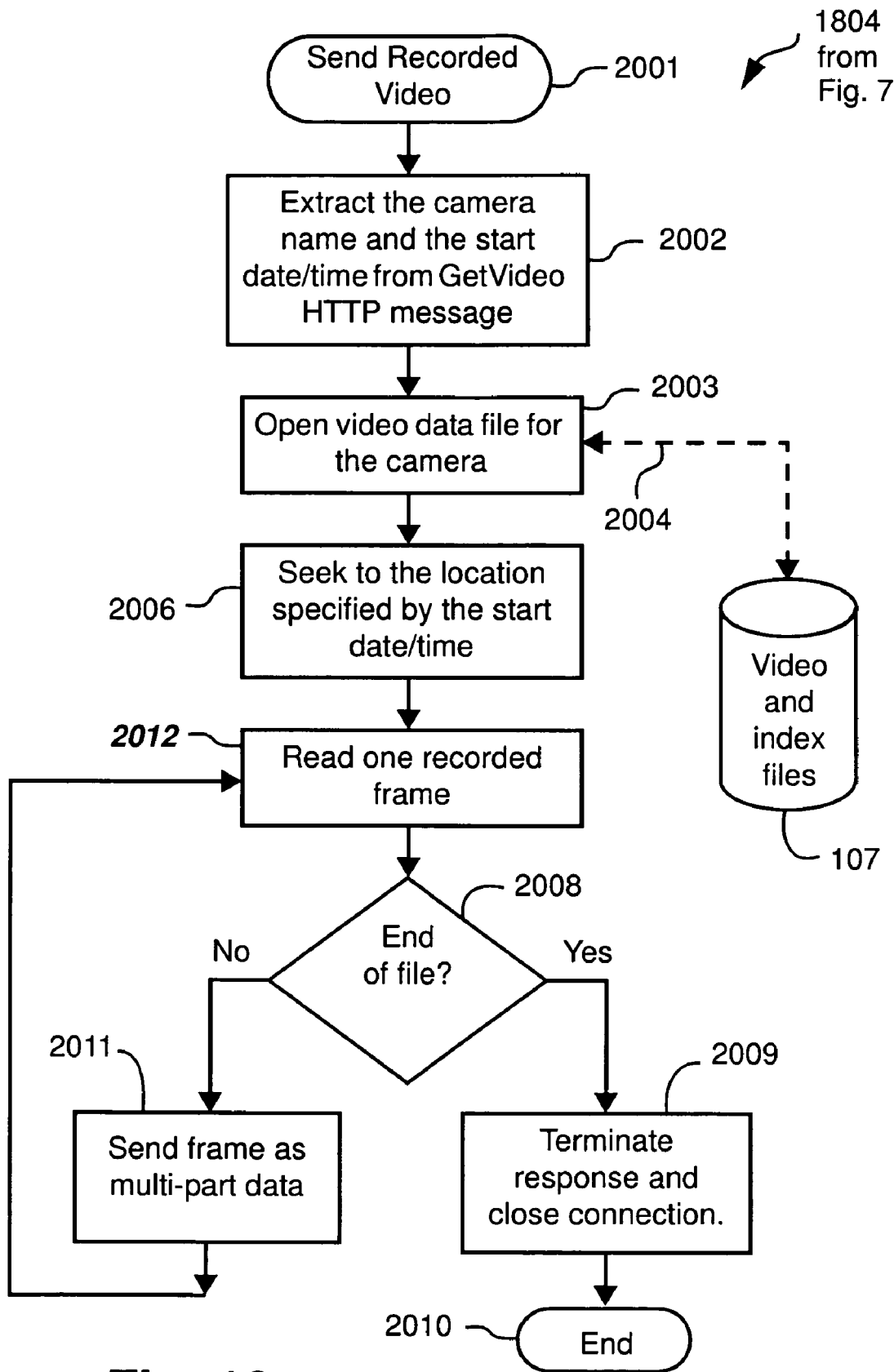
FIG. 10 shows a process flowchart for streaming recorded video by the Storage Server Application as depicted in FIG. 7.

FIG. 10 shows a flowchart of the process 1804 (see FIG. 7) for streaming recorded video by the Storage Server Application 105 in response to a GetVideo command at 1811 in FIG. 7. The process 1804 starts with a step 2001 in which the routine 1804 is called. In a following step 2002, the Storage Server 105 extracts the camera name, and the start date and time from the GetVideo HTTP message received from the viewer application 101 in the step 1802 in FIG. 7. A following step 2003 extracts, as depicted by a dashed arrow 2004, the video data file 2201 (see FIG. 5A) and the corresponding video index file 2203 (see FIG. 5B) for the camera identified in the step 2002 from the video and camera database 107. In a following step 2006, the Storage Server 105 "seeks", using the video index file 2203, to the location specified by the date and time extracted in the step 2002. The video index file 2203 is used to seek to the correct offset in the video data file 2201 based on the aforementioned start date and time.

Then in a step 2012 the process 1804 reads a frame from the video data file 2201, commencing with the frame having the correct offset as determined in the step 2006. A following step 2008 determines if an end-of-file indication has been detected in the video data file 2201. If this is not the case, then the process 1804 follows a NO arrow to a step 2011 in which the frame that is read in the step 2012 is sent back to the viewer application 101 in a HTTP response message, each such frame being sent as multi-part data. The multi-part data contains the image data and the timestamp which represents the time of capture of the image from the camera. The process 1804 then is directed back to the step 2012. Returning to the step 2008, if the step 2008 detects an end of file indication, then the process 1804 follows a YES arrow to a step 2009, in which the HTTP response is terminated and the connection to the Viewer Application is closed. The process 1804 then terminates in an END step 2010.

Figure 11:
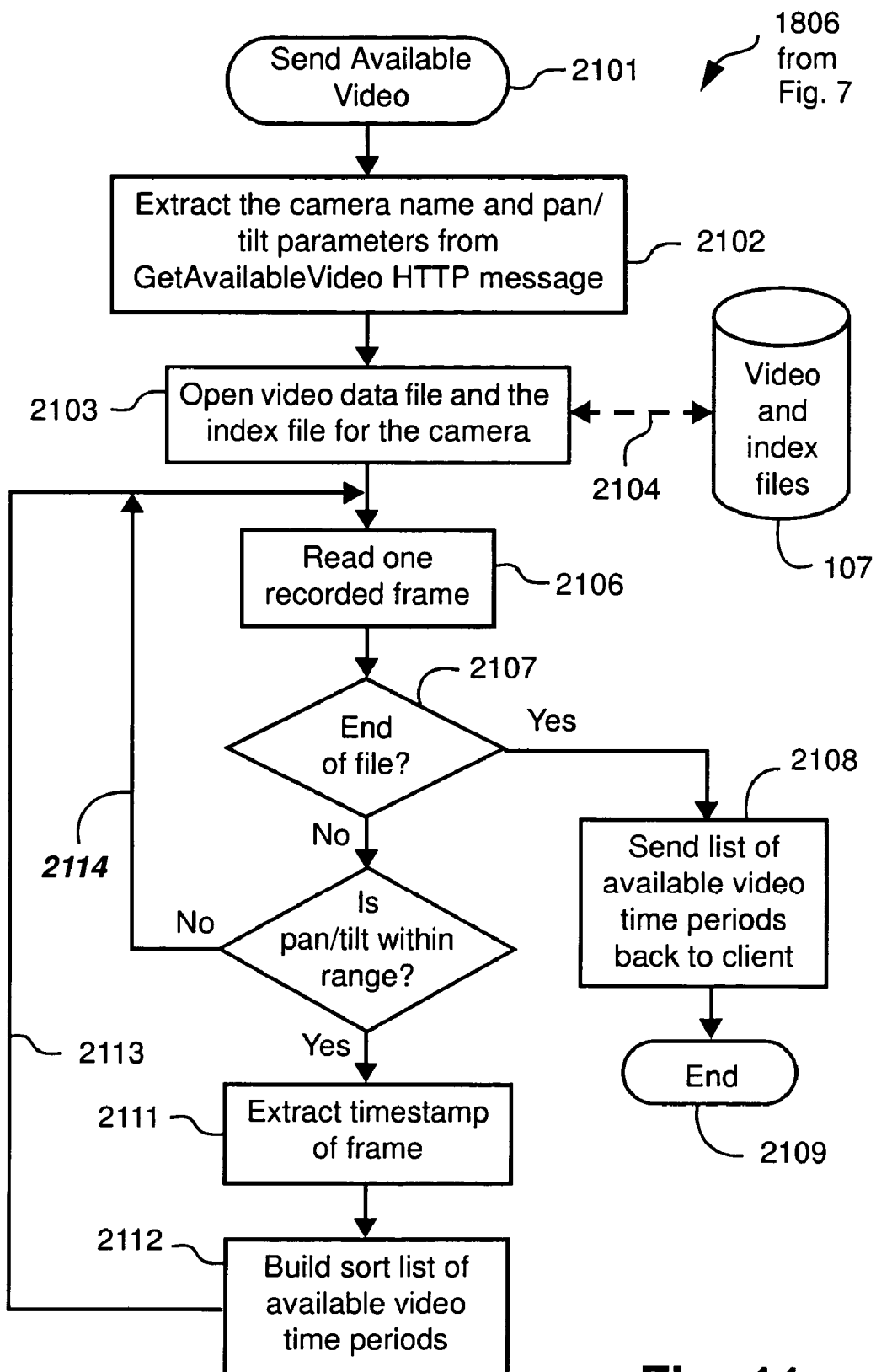
FIG. 11 shows a process flowchart for sending available video indications by the Storage Server Application as depicted in FIG. 7.

FIG. 11 shows a flowchart of the process 1806 (see FIG. 7) for sending available video indications by the Storage Server Application in response to a GetAvailableVideo command at 1810 in FIG. 7. An initial step 2101 depicts that the process 1806 has been called via the GetAvailableVideo command at 1810 in FIG. 7. In a following step 2102 the Storage Server 105 extracts the camera name, and pan and tilt range parameters from the GetAvailableVideo HTTP message at 1810 (see FIG. 7). A following step 2103 extracts, as depicted by a dashed arrow 2104, the video data file 2201 (see FIG. 5A) and the corresponding video index file 2203 (see FIG. 5B) for the identified camera from the video and camera database 107, and opens these extracted files.

A following step 2106 reads a record such as 2204 (see FIG. 5B) from the index file 2203. A following step 2107 determines if an end of file indication has been detected. If this is not the case then the process 1806 follows a NO arrow to a step 2110 which determines if the pan and tilt range parameters extracted from the corresponding image header of the extracted record are within the specified range read in the step 2102. If this is the case, then the process 1806 follows a YES arrow and a following step 2111 adds the timestamp associated with the record to a list of timestamp ranges to be sent back in the response. Timestamps are stored in sorted order for building up the timestamp ranges, and consecutive timestamps are grouped together to form a range with a start and end, provided that the difference between consecutive timestamps is within a threshold typically determined by the lowest frame rate supported by the cameras. The process 1806 is then directed back to the step 2106.

Returning to the step 2110, if the pan and tilt extracted from the header is not in the range, then this frame is skipped, the process is directed according to a NO arrow back to the step 2106, and the Storage Server 105 proceeds with the next frame. Returning to the step 2107, once all records in the index file 2203 are scanned, an end of file indication is detected by the step 2108 which then directs the process 1806 via a YES arrow to a step 2108. The step 2108 returns the list of accumulated time periods back to the viewer application 101 in the body of a HTTP response message. Each line of the body will typically comprise a start and an end timestamp. The process 1806 then terminates in an END step 2109.

Turning from the storage server application 105 to the camera 103, it is noted that the camera 103 runs the network camera application 2732 (see FIG. 2) in order to support a HTTP based protocol for receiving camera control commands, and for transmitting captured image information. These camera HTTP commands have the following general form:

$$\text{http://<ip\_or\_host>:<port>/<command>?<optional\_parameters>;} \qquad [2]$$

where,

Ip_or_host: IP address or host name of the network camera;

Port: Port on which the Camera web server is listening. Typically this is 80;

Command: The HTTP commands supported by the camera are GetPanoramaList, GetLiveImage and GetPanoramaImage.

Figures 12A, 12B:
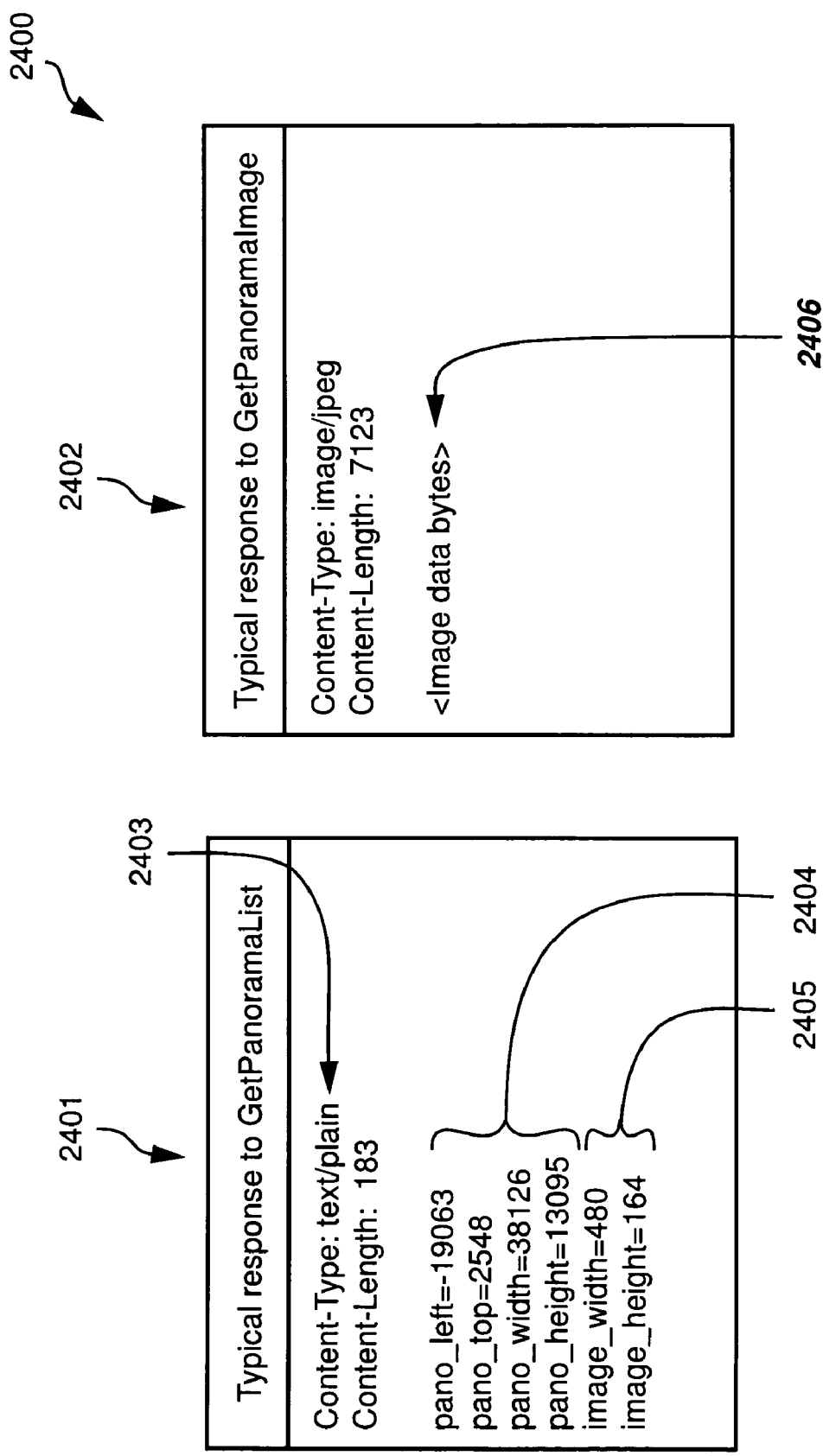
FIGS. 12A and 12B are, respectively, typical responses to GetPanoramaInfo and GetPanoramaImage commands, returned by the camera.

The aforementioned commands have the following functionality:

1. GetPanoramaInfo: Command to get information about the dimensions of the panorama. The response is a HTTP response message 2401 (see FIG. 12A) with a plain-text body (see 2403) containing the dimensions of the panorama (see 2404) which is in the same units as the pan, tilt and zoom information (i.e. $\frac{1}{100}^{th}$ degree units) and the dimensions of the panorama image (see 2405). FIG. 12A depicts a typical response from the camera 103 in response to a GetPanoramaInfo command. It is noted that in this arrangement, the panorama image information is stored in the camera 103. Other arrangements in which the panorama information is stored and/or generated elsewhere can also be used.

2. GetPanoramaImage: Command to get a panorama image. The response is a HTTP response message (see

2402 in FIG. 12B) with the message body (see 2406) being a JPEG image. FIG. 12B depicts a typical response returned by the camera 103 in response to receiving a GetPanoramaImage command.

3. GetLiveImage: Command to get live images from the camera. This command returns images in JPEG format organised as multi-part data in the HTTP response.

Returning to FIGS. 12A and 12B, it is noted that the panorama image represents, in one arrangement, the complete extent of camera coverage. This image can, according to one arrangement, be created by panning and tilting the camera to point at all possible non-overlapping regions in the camera Field of View, and capturing one image at each one the aforementioned positions. These individual images are then typically attached to one another to reflect their spatial positions and presented as a single panorama image.

Figure 13:
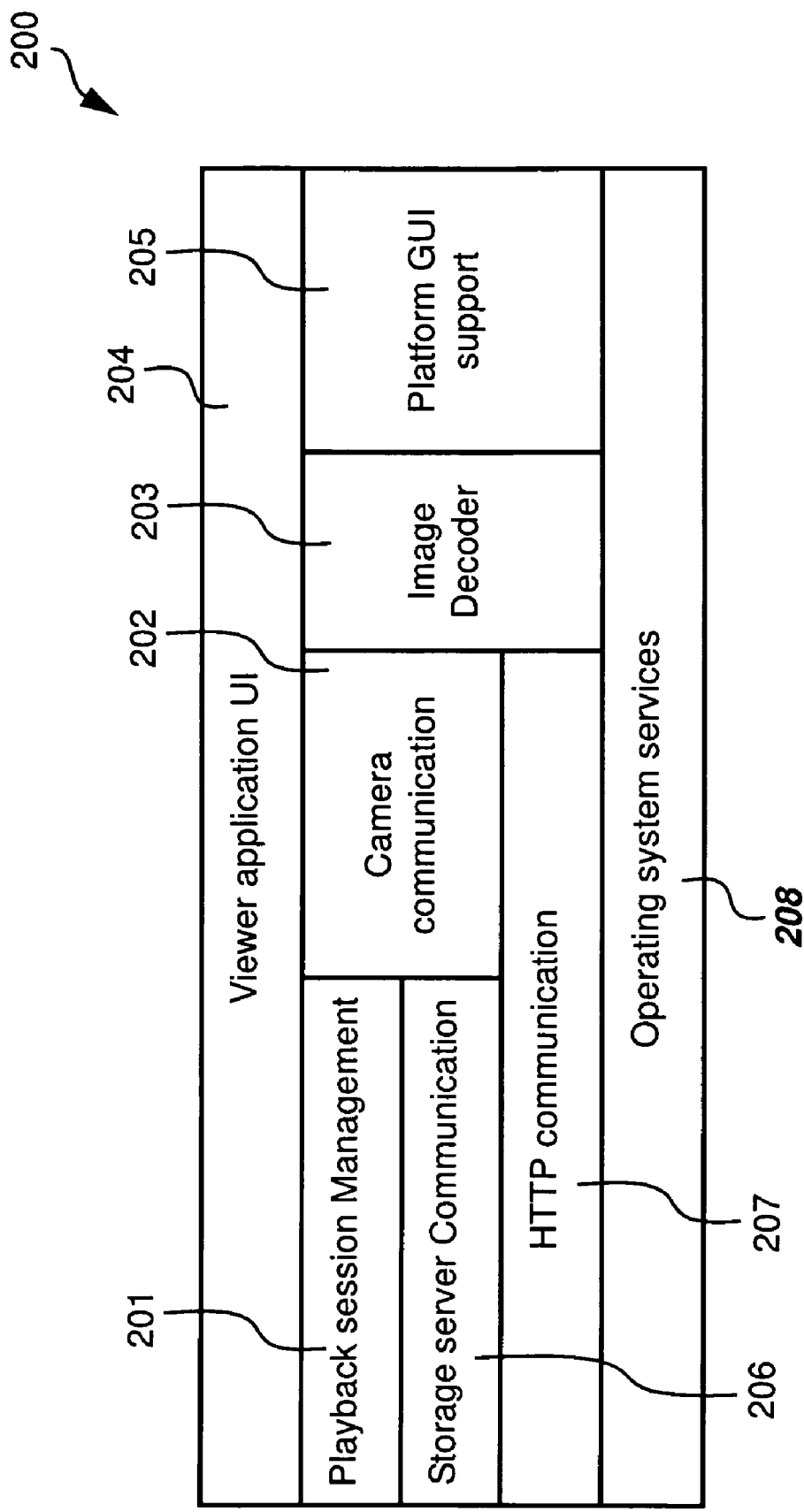
FIG. 13 is a layered architecture of the Viewer Application.

FIG. 13 shows a layered architecture 200 depiction for the Viewer Application 101. The Viewer Application 101 implements a Graphical User Interface (GUI) which presents video frames sent from the storage server 105 and the panorama image from the camera 103 in a useful and intuitive manner. The user of the system 100 has the ability, for instance, to select a camera such as 103, and a start date and time for accessing and viewing recorded video from the Storage Server 105. The Viewer application 101 communicates with the Storage Server 105 using the HTTP protocol 104. The Viewer Application 101 typically communicates with a pre-configured storage server 105 whose IP address and port number is typically specified on the command-line or a configuration file. The layered representation 200 of the Viewer Application 101 shows component modules as follows:

The Viewer Application GUI module 204;
A Playback Session Management module 201;
A Storage Server communication module 206;
A Camera Communication module 202;
An Image Decoder module 203;
A Platform GUI support module 205; and
An Operating system services module 208.

Figure 14:
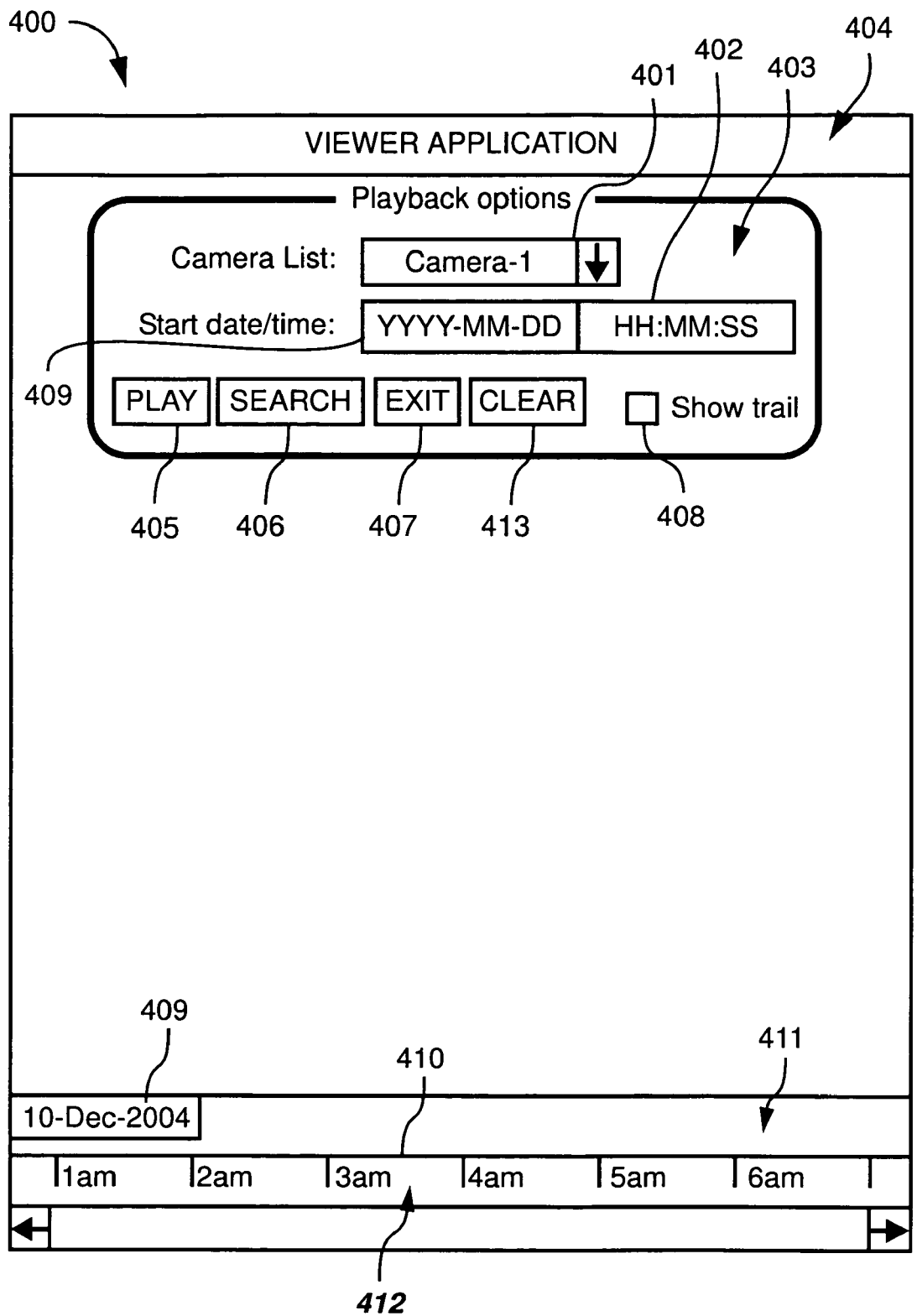
FIG. 14 is the user interface of the Viewer Application on start-up.

FIG. 14 shows the GUI 400 of the Viewer Application 101 on start-up of the system 100. The Viewer application 101 implements a GUI that provides the user with the ability to retrieve and play back recorded video information from the Storage Server 105 and to view the video information. The GUI comprises the following graphical elements:

Pick-list 401 for choosing a camera name;
A text box 409 for specifying a start date;
A text box 402 for specifying a start time;
A "Show Trail" check box 408 to enable tracking of camera movement on the panorama image while viewing recorded video;
A PLAY button 405 to play recorded video from the storage server 105 for a particular camera starting from a given date and time;
A SEARCH button 406 to get either (i) available video indications (to be depicted, for example, at 807 on a timeline 810 in FIG. 18) from the Storage Server 105 for a given range of camera positions (as specified, for example, at 804 on a panorama window 803 in FIG. 18) or for getting a range of camera positions (to be depicted, for example, at 3002 on a panorama window 3001 in FIG. 19) for a given time period (as specified, for example, at 3003 on a timeline 3004 in FIG. 18);
An EXIT button 407 to exit the application;
A CLEAR button 413 to clear all indications on the active panorama window and the corresponding indications on the timeline;

A TIMELINE 411 which is a scrollable window for representing time. Typically the timeline 411 is configured to display time at any given precision ranging from days, to hours to minutes to seconds. The timeline consists of a top half 411 and a bottom half 412 which are used to represent time periods using rectangular regions spanning across the timeline. The top area is used to represent time periods (eg see 610 in FIG. 16) corresponding to camera positions when the "Show trail" feature is used. Each of the regions (eg 610 in FIG. 16) is suitably labelled typically with a sequence number (eg see 613 in FIG. 16), and is correlated to similarly labelled regions (eg see 602 in FIG. 16) on the panorama image using a sequence number. Rectangular regions on the timeline are drawn with the same colour as the regions in the panorama to which they are related. The bottom area 412 is used to show available video (807-809 in FIG. 18) for a user-specified region within the panorama window 804. The timeline always displays trail and available video indications relating to the currently active panorama window. A user can also specify the region 3003 in the timeline 411 in order to designate a time period of interest as shown in FIG. 19. This is typically used in the camera coverage search feature.

In addition to the above GUI elements, two other GUI elements are displayed by the viewer application 101. These elements are shown in FIG. 15, FIG. 16, FIG. 17, FIG. 18, and FIG. 19, and comprise the following elements.

Panorama Window: The panorama window (e.g., 505 in FIG. 15) displays the panorama image captured from the camera 103. The panorama window also displays camera control state information such as camera position and zoom angle indication, typically as a rectangular region. There is one such indication for every video window that is displaying a frame captured from the camera and recorded on the storage server 105. There is typically one panorama window for a camera whose images are cuffently being displayed. If the "Show Trail" option 408 is selected before the "PLAY" button 405 is clicked or the timeline 410 is double-clicked with the mouse 2703, then there will typically be one or more semi-transparent rectangular regions e.g., 602 in FIG. 16) displayed on the panorama window (605 in FIG. 16) which indicate camera coverage in the recorded video. The "double-clicking" operation, as applied to a particular graphical control such as the timeline, is refeffed to more generally as "designating" the noted control. The panorama window (e.g., 3001 in FIG. 19) is also used to display camera coverage search results such as 3002 when the user selects the associated time period of interest 3003 on the timeline 3004 and clicks the search button 3005. This aspect of the display is described in relation to in FIG. 19.

When more than one panorama window (e.g., 704, 706 in FIG. 17) is open in the Viewer Application 101, the one of the panorama windows is designated as the "active" panorama window. This "active" state can be changed by the user clicking, using the mouse 2703, on a panorama window which is not currently active to make it active. The active panorama window is typically identified by its title bar. The title bar of the active one typically has the word "Active" appended (see 708 in FIG. 17). The timeline display is always associated with the active panorama window and all indications on the timeline are with respect to the active panorama window. When the active panorama window changes as a result of user action, typically clicking on another not currently active panorama window, the timeline is also updated and refreshed accordingly.

Video Window: A video window (e.g., 503 in FIG. 15) displays the stored image captured from the camera and recorded on the Storage Server 105. Along with the image display, a timestamp 509 representing the time of image capture is displayed below the image display 503. Every time the user selects a camera (using 501), specifies a start date and time (using 409 and 402 respectively) and clicks the "PLAY" button 405, a new video window such as 503 is opened to display frames from the specified start time. Another way of creating a video window is by double-clicking, using the mouse 2703, on the timeline 410 in an area which indicates available video (this will be described in more detail in regard to FIG. 22.

FIG. 15, FIG. 16, FIG. 17, FIG. 18 and FIG. 19 show different states of the Viewer Application user interface 204 depending upon the user action.

Figure 15:
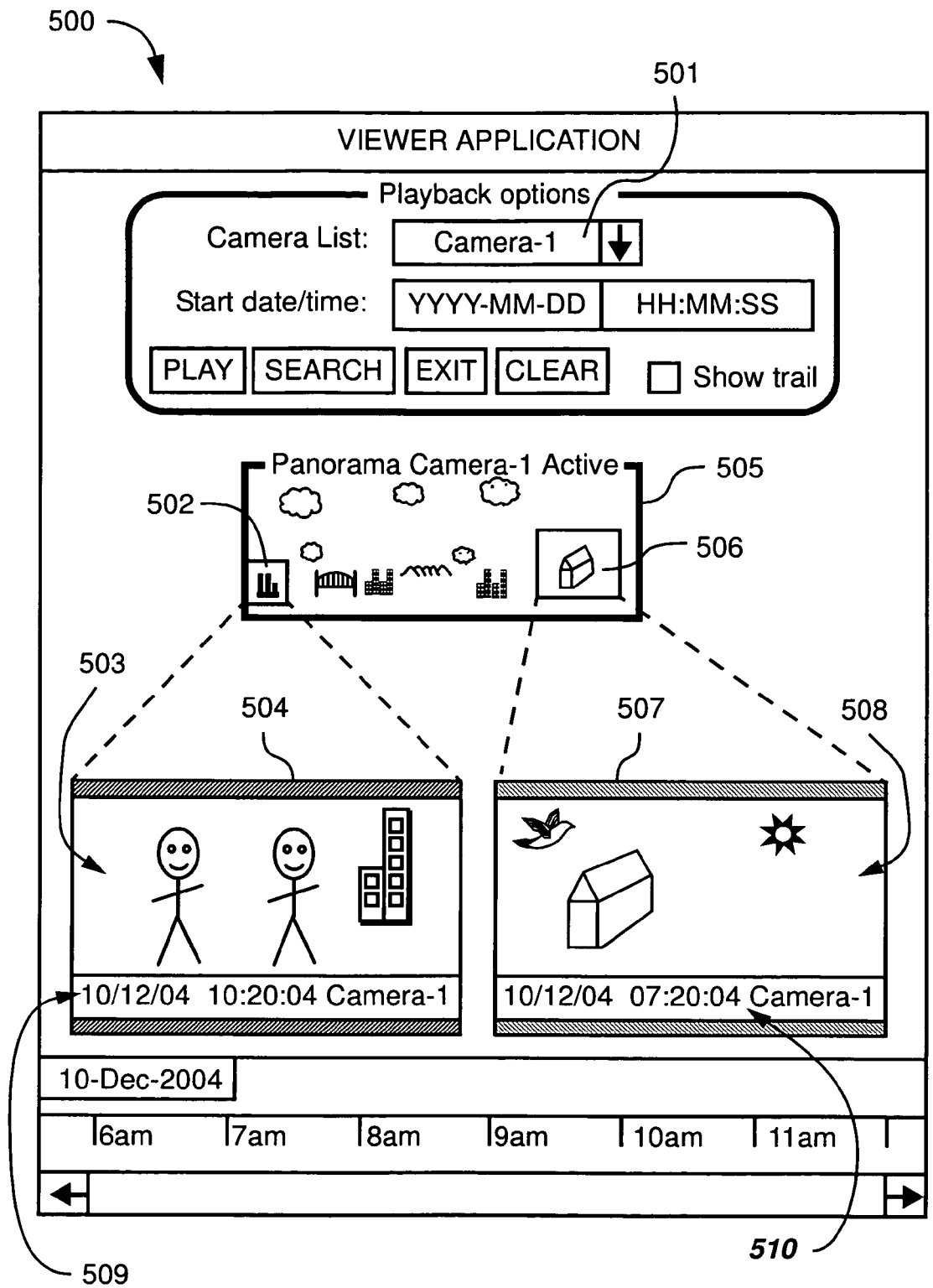
FIG. 15 is the user interface of the Viewer Application visualising camera position for frames from different time periods captured from the same camera.

FIG. 15 is the user interface 500 of the Viewer Application 101 presenting camera position for frames from different time periods captured from the same camera. In this exemplary scenario, the user has firstly chosen Camera-1 from the pick list 401, specified a start date of 10 Dec. 2004 using the control 409, specified a start time prior to 10:20:04 (in 24-hour notation) using the control 402, and clicked on the "PLAY" button 405. The user has subsequently chosen the same start date 10 Dec. 2004 using the control 409, but has selected a start time prior to 07:20:04 using the control 402, and again clicked on the "PLAY" button 405. The result of the aforementioned sequence of events is that the Viewer application 101 has opened a panorama window 505 for Camera-1 and two video windows (503 and 508) for displaying recorded video for Camera-1. The video windows 503 and 508 simultaneously display video frames from the different time periods selected. The video window 503 thus shows stored video footage at 10 Dec. 2004 and 10:20:04 (as depicted by 509), while the video window 508 shows stored video footage at 10 Dec. 2004 and 07:20:04 (as depicted by 510).

Figure 16:
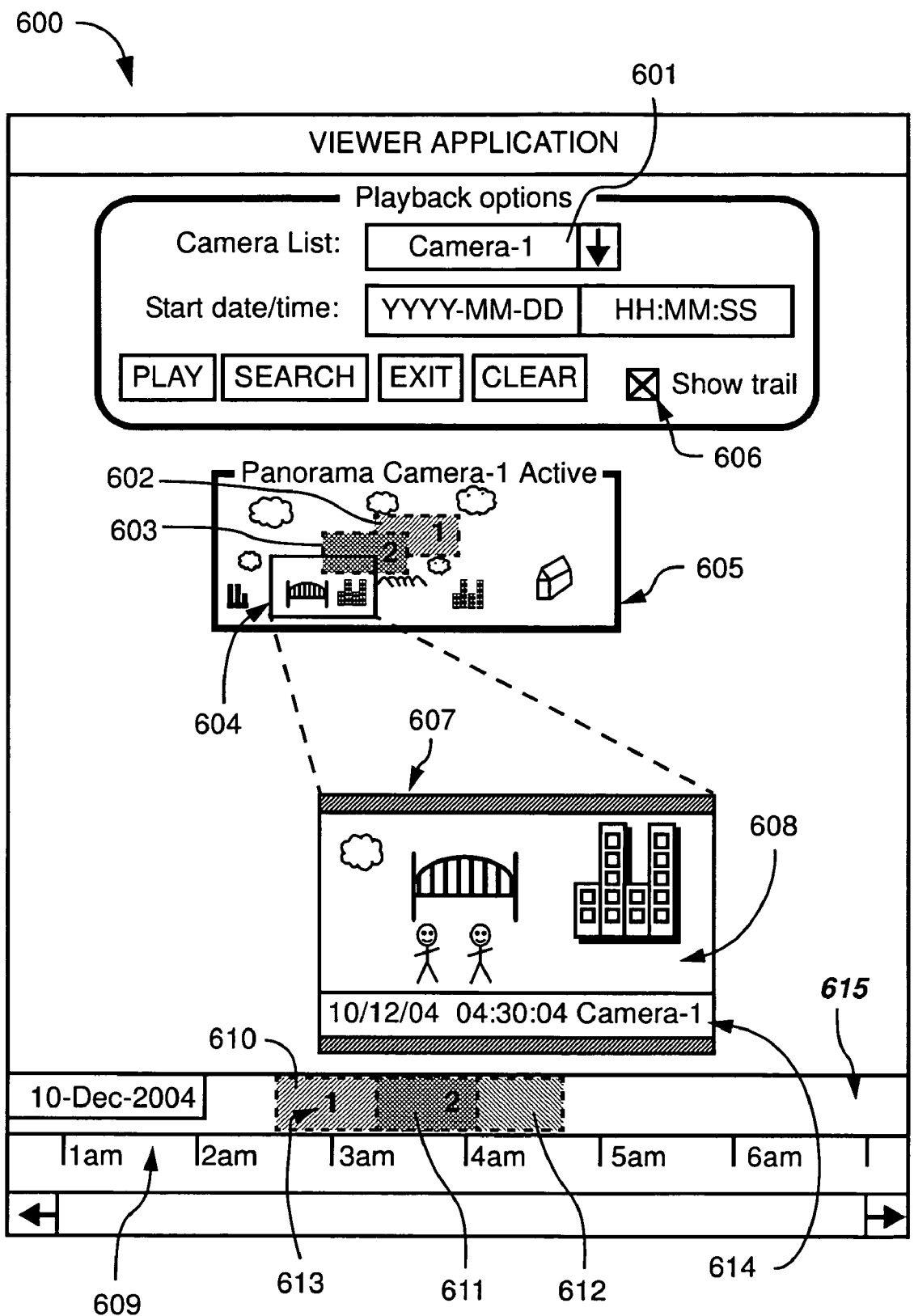
FIG. 16 is the user interface of the Viewer Application visualising camera coverage using the "trail" feature.

FIG. 16 is the user interface 600 of the Viewer Application 101 representing camera coverage using the "trail" feature. In this arrangement, the user has chosen Camera-1 from the pick list 401, specified a start date of 10 Dec. 2004 using the control 409, specified a start time prior to 04:30:04 using the control 402, turned on the "Show Trail" option using 606, and clicked on the "PLAY" button 405. The Viewer Application 101 opens the panorama window 605 for Camera-1, and opens a video window 608 for displaying video from the specified start date and time as shown by 614.

The camera coverage indication on the panorama 605 is typically shown as semi-transparent labelled rectangular regions 602, and 603 for time periods previous to 10 Dec. 2004 at 04:30:04. Each of these displayed regions 602-603 has a corresponding representation (610, and 611 respectively) on the top half 615 of the timeline. These timeline representations are, in the present example, rectangular regions 610-611 with the same respective sequence number labels and colours. The rectangular regions on the timeline represent the respective time periods for which the camera was in the corresponding region displayed on the panorama image.

In addition to the aforementioned labelled rectangular regions 602, 603 on the panorama 605 and 610, 611 on the timeline 615, there is also an unlabelled rectangular region 604 on the panorama 605, and a corresponding unlabelled rectangular region 612 on the timeline 615, which correspond to the time period for the camera position 604.

From a terminology perspective, the term "recorded periods" refers to the fact that for a first time period (say 10 Dec. 2004, 02:30:00 to 10 Dec. 2004, 03:15:00) camera-1 was pointing at the region "1" (i.e., 602) in the panorama 605. Thereafter, for a second time period (say 10 Dec. 2004, 03:15: 10 to 10 Dec. 2004, 04:05:00) camera-1 was pointing at the region "2" (i.e., 603) in the panorama 605. Thereafter, for a third time period (say 10 Dec. 2004, 04:05:10 to 10 Dec. 2004, 04:30:04) camera-1 was pointing at the region 604 in the panorama 605. All the aforementioned recorded periods are historic, in the sense that all the video information presented by the system 100 is made up of video sub clips derived from previously recorded captured video information, however the aforementioned first time period occurred prior to the second time period which in turn occurred prior to the third time period.

Each trail region such as 602 on the panorama window 605 can be displayed, for example, for a predetermined time (see FIG. 28) after the associated video images have been displayed in the video window 608, after which time the display of the trail region (i.e., display of the sub clips associated with the region) ceases to be displayed. Alternately, the trail region can be continuously displayed until the user operates a CLEAR control such as 413 in FIG. 14.

Figure 17:
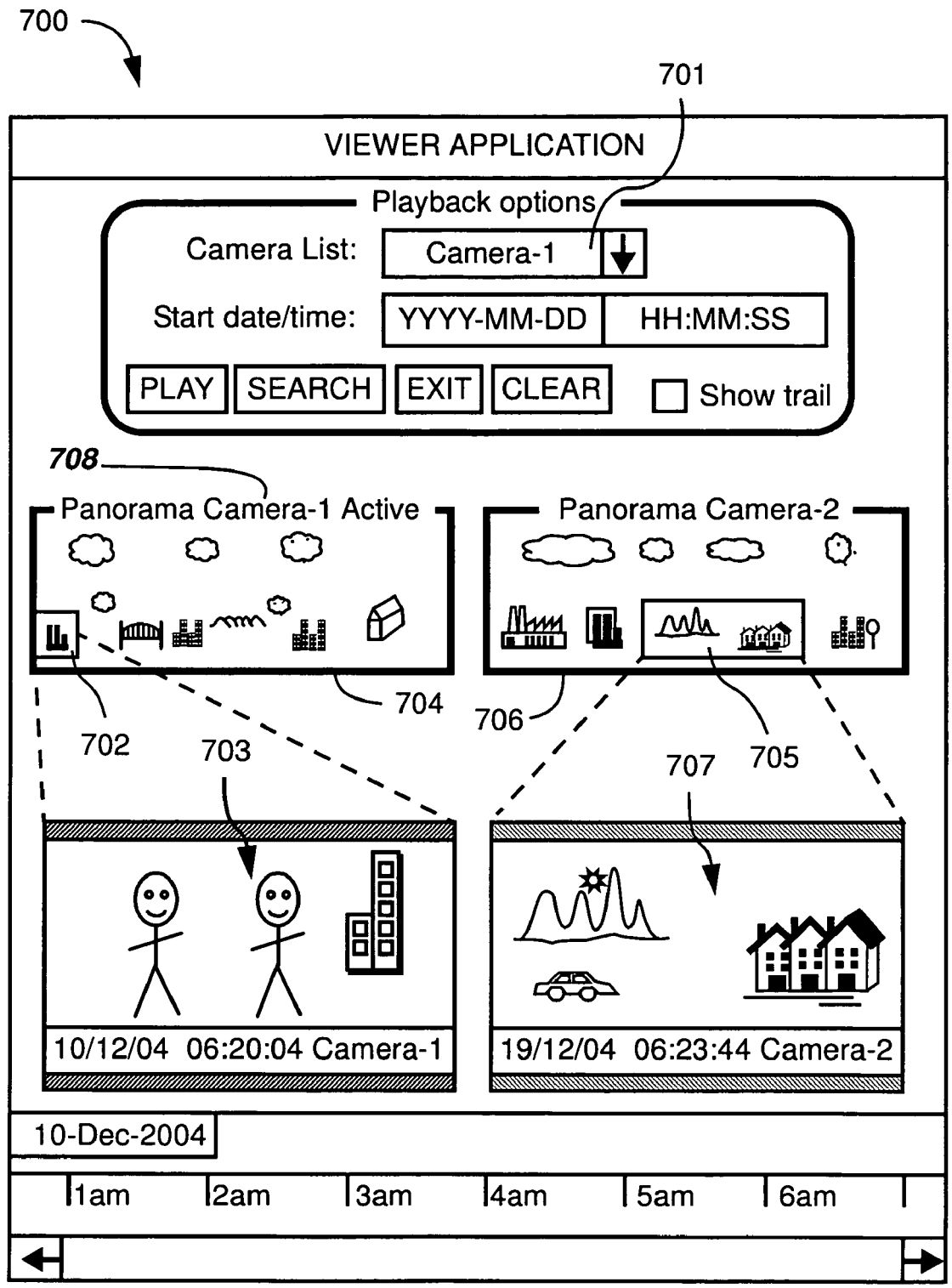
FIG. 17 is the user interface of the Viewer Application for visualising the positions of two different cameras simultaneously.

FIG. 17 is the user interface 700 of the Viewer Application 101 presenting recorded information captured by two different cameras simultaneously. In this arrangement, the user has chosen Camera-1 from the pick list 701, specified a start date of 10 Dec. 2004, and specified a starting time prior to 06:20: 04, and has operated the "PLAY" button 405. The viewer application 101 consequently opens a panorama window 704 for Camera-1 and a video window 703 for displaying recorded video information relating to the specified start date and time. A region 702 on the panorama view 704 indicates the control state of Camera-1 during the time period associated with the display 703.

Further, the user has subsequently chosen Camera-2 from the pick list 701, selected a different start date of 19 Dec. 2004 and a different start time prior to 06:23:44, and clicked on the "PLAY" button 405 again. The viewer application 101 consequently opens a panorama window 706 for Camera-2 and a video window 707 for displaying recorded video information relating to the specified start date and time. A region 705 on the panorama view 706 indicates the control state of Camera-2 during the time period associated with the display 707. The end result is that there is a composite representation consisting of the two panorama windows 704 and 706 and the associated two video windows 703 and 707 that are opened, one for Camera-1 and another for Camera-2 respectively.

Figure 18:
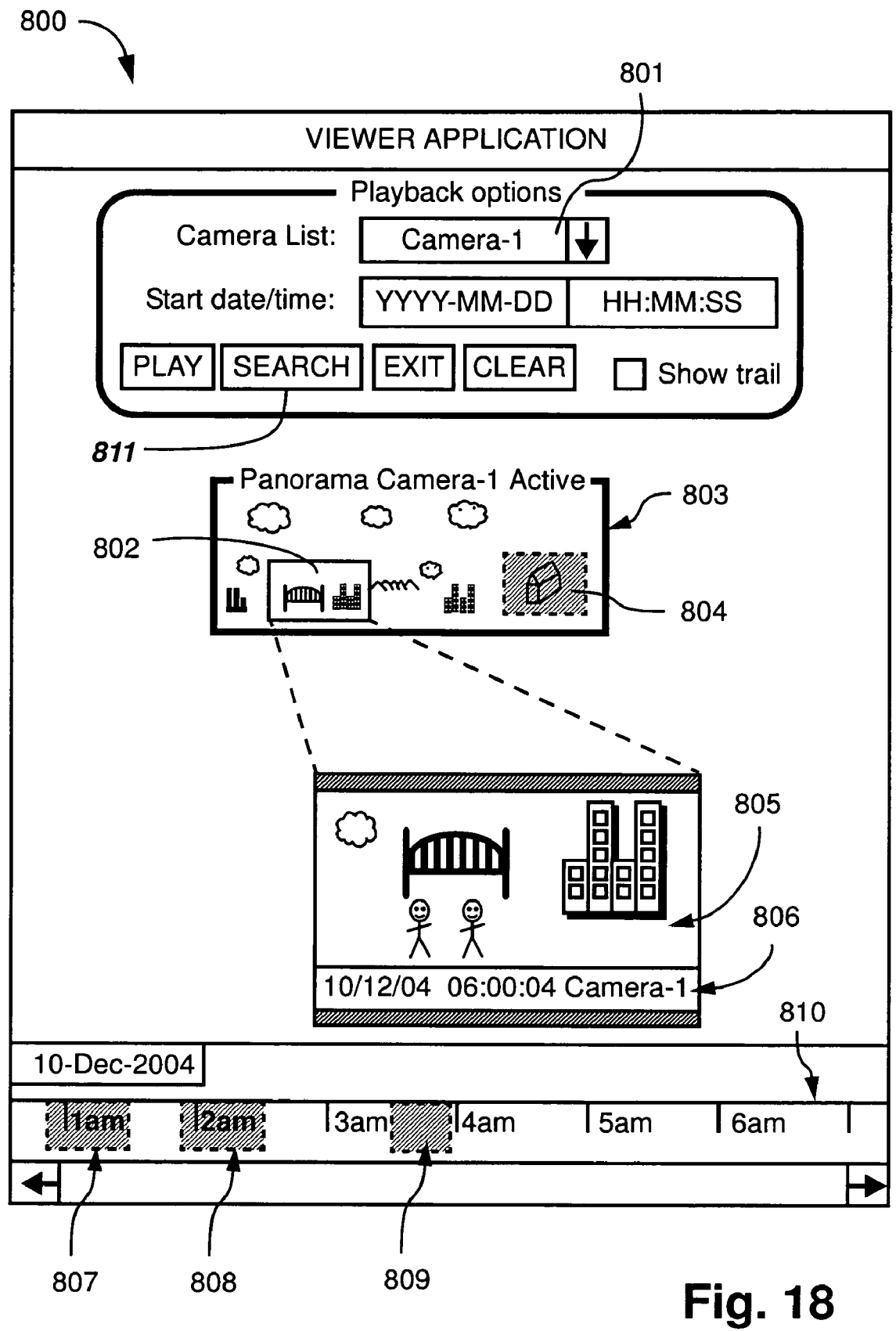
FIG. 18 is the user interface of the Viewer Application showing usage of the available video search feature.
Figure 19:
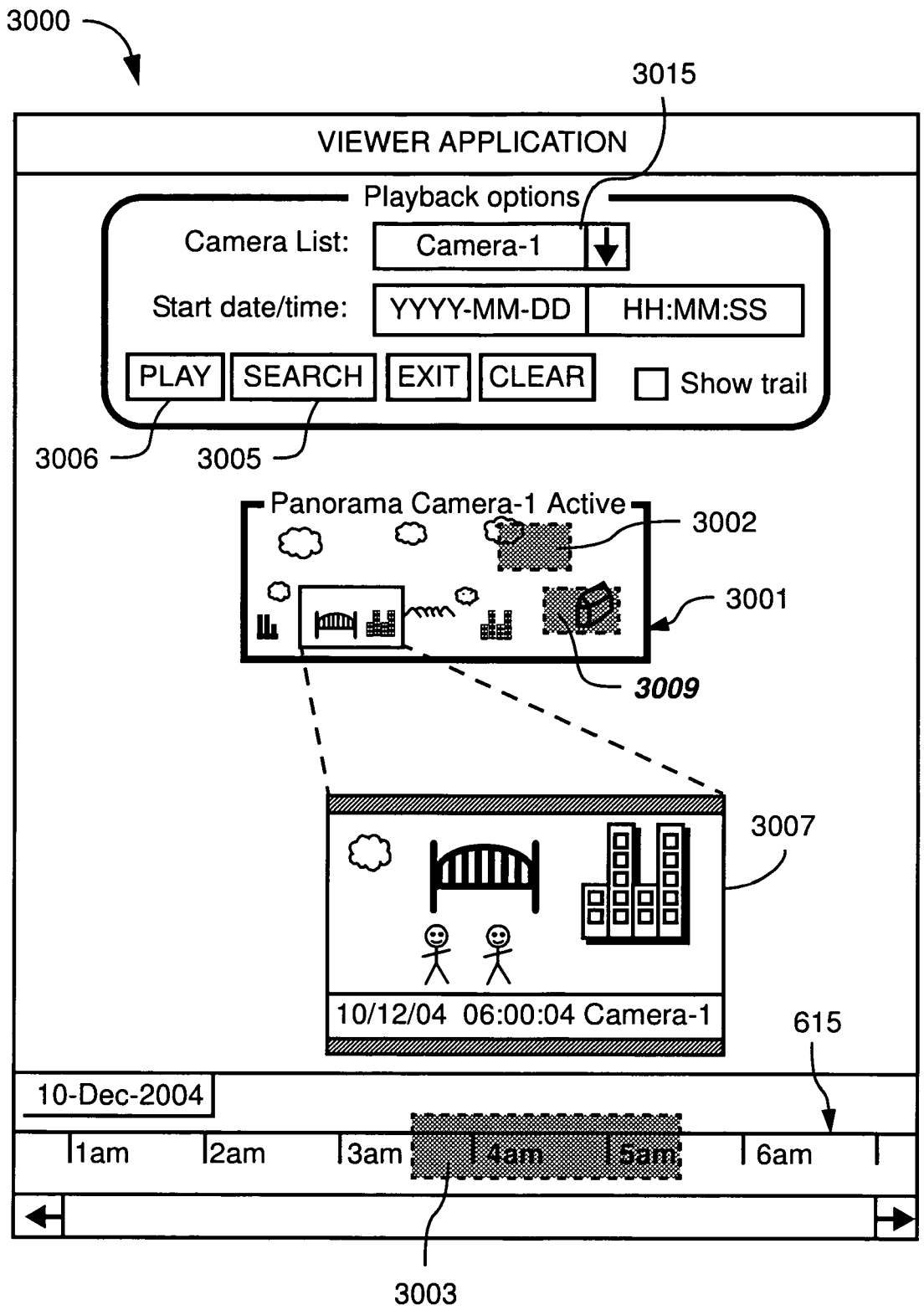
FIG. 19 is the user interface of the Viewer Application showing usage of the camera coverage search feature.

FIG. 18 is the user interface 800 for the Viewer Application 101 showing one arrangement using the "available video" feature. In this arrangement the user specifies a region of interest 804 on the panorama image 803 in order to determine when the system 100 collected video information from the designated region of interest 804. It may be that the system 100 has never been directed at the specified region 804, in which case no time indications will be shown on the timeline 810. If on the other hand the system 100 has, during particular time intervals been directed at the region of interest 804, then those time intervals (e.g., 807-809) are depicted on the timeline 810.

In the example shown in FIG. 18, the user has chosen Camera-1 from the pick list 801, has specified a start date of 10 Dec. 2004 and a start time prior to 06:00:04, and has clicked on the "PLAY" button 405. The viewer application 101 opens the panorama window 803 for Camera-1 and a video window 805 for displaying video from the specified start date and time. Further, the user also specified the rectangular region 804, this being the region of interest previously referred to, on the Panorama window and clicked on the "SEARCH" button 811.

The Viewer Application 101 determines available video indication(s) from the Storage Server 105 for the designated region 804, and displays the results in the bottom half of the time line 810 as shown by the shaded rectangular regions 807-809. These regions 807-809 indicate time periods for which recorded video is available for the user specified shaded region 804 in the panorama image 803.

Returning to FIG. 13, and particularly to the playback session management module 201, it is noted that whenever the user clicks on a PLAY button 405, a new playback session is created. This session manages the communication between the Viewer Application 101 and the Storage Server Application 105. A video window such as 805 which displays the recorded video frame is associated with each playback session. All video windows showing recorded video of the same camera such as Camera-1 are associated with a single panorama window such as 803 displaying a panorama image from the camera whose recorded video is being viewed.

Typically, a unique colour is associated with each playback session and this colour is used to paint the borders (as depicted by 504 and 507 in FIG. 15) of the video window (e.g., the windows 503 and 508 in FIG. 15) as well as to paint rectangular regions (such as 610 and 611 in FIG. 16) on the timeline and on the panorama window (such as 602 and 603 in FIG. 16). The reason for associating a unique colour with a video window, a corresponding region on a timeline, and a corresponding region on a panorama window is to create a visual association between the video window displaying a recorded frame with its corresponding position or range indicator on the panorama. Further the aforementioned use of colour coordination also serves to distinguish multiple such position indications corresponding to different video windows on a single panorama image.

In order to correlate rectangular regions within panorama windows indicating camera coverage with their corresponding regions in the timeline indicating time periods, sequence numbers (such as 602 and 603 for the panorama window 605 and 610 and 611 for the timeline 615 in FIG. 16) are used to label the rectangular regions. These sequence numbers are displayed whenever a camera moves to a new position.

When the "Show Trail" option 606 is used, the playback session module 201 maintains all the data necessary to show indications of time periods on the time line. The data related to available video indications is stored in the memory 2706 in FIG. 2 along with the panorama image and shared among all playback sessions associated with the same panorama image.

Returning to FIG. 13, the Storage Server communication module 206 deals with communication between the viewer application 101 and the Storage server 105. This involves sending HTTP requests to the Storage Server 105 and processing the received HTTP responses from the storage server 105.

The Camera communication module 202 handles all aspects of communicating between the viewer application 101 and a camera such as 103 in order to retrieve a panorama image and associated information from the camera.

The Image decoder module 203 is typically a JPEG decoder that is used to render JPEG images on the display device 2714.

The Platform GUI support module 205 is, in the present example, the GUI support infrastructure provided by the software operating system of the computer 2701 in FIG. 2. This module 205 is used to develop the GUI components of the Viewer Application.

The Operating system services module 208 represents the Application Programming Interface provided by the operating system or platform (of the computer 2701) on which the Viewer Application 101 runs.

FIG. 19 shows a view 3000 of the user interface of the Viewer Application 101, showing usage of the camera coverage feature. In this arrangement, the user has chosen Camera-1 from a pick list 3015, specified a start date of 10 Dec. 2004, specified a start time prior to 06:00:04, and clicked on a "PLAY" button 3006. The viewer application 101 opens the panorama window 3001 for Camera-1 and a video window 3007 for displaying video from the specified start date and start time. Further, the user has designated the rectangular region 3003 on the timeline 3004, the designated region 3003 representing time period of interest. The user has then clicked on the "SEARCH" button 3005. The Viewer Application 101 gets the camera coverage indication(s) from the Storage Server 105 for the specified time period 3003 and displays the result as respective rectangular regions 3002, 3009 on the panorama image 3001. The shaded rectangular regions 3002 and 3009 on the panorama window 3001 thus indicate the areas covered by the camera during the specified time periods of interest.

Figure 20:
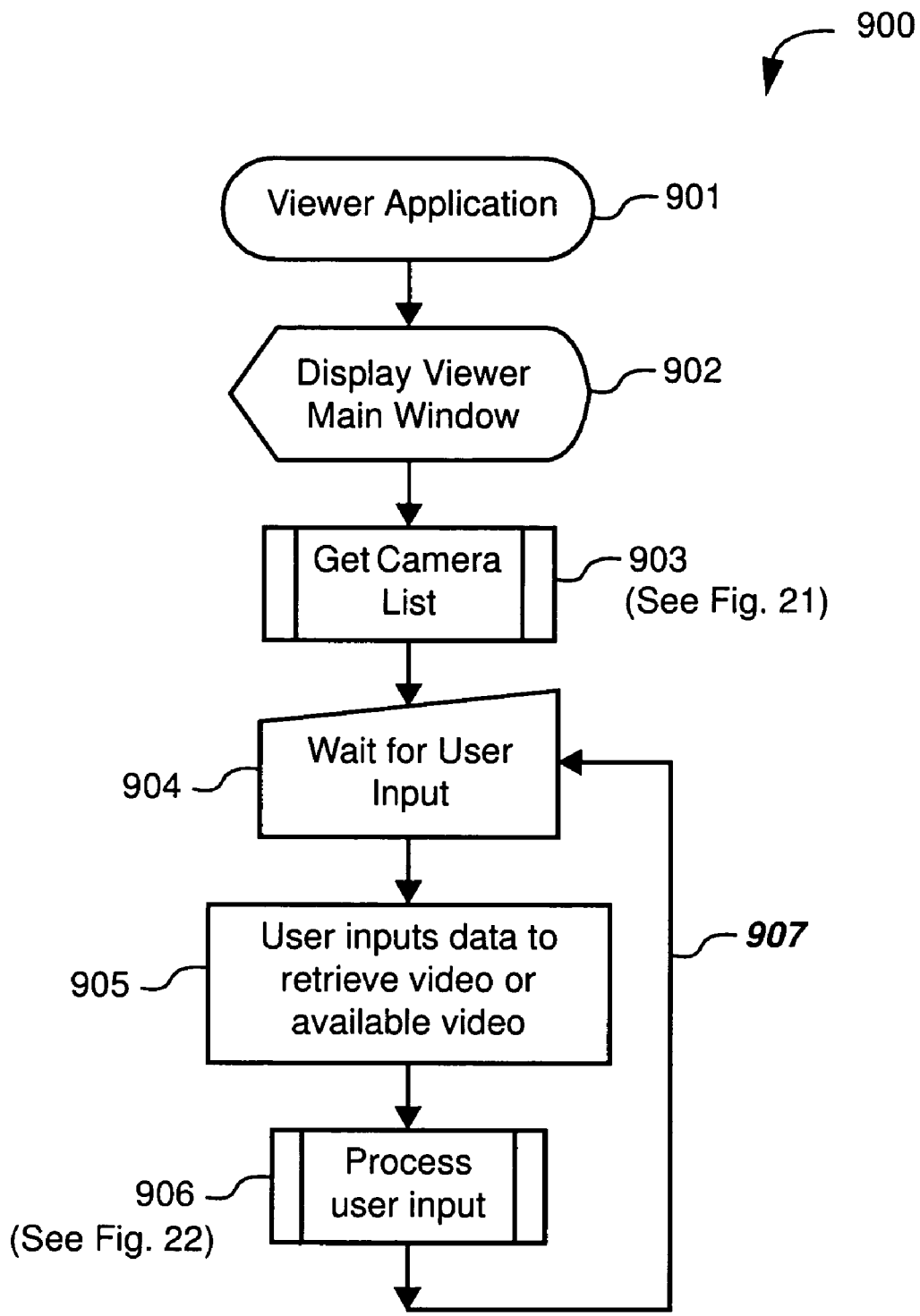
FIG. 20 is a process flowchart showing high level functionality of the Viewer Application.

FIG. 20 is a flowchart of a process 900 providing high level functionality of the Viewer Application 101. An initial step 901 depicts the nature of the process, and in a following step 902, upon start-up of the application 101, the viewer application 101 creates the graphical user interface as shown in FIG. 14 and displays it on the display 2714 (see FIG. 2). The Viewer application 101 then retrieves, in a following step 903, a list of camera names, their IP addresses and port numbers from the video and camera database 107 via the Storage server 105. This is described in more detail in regard to FIG. 21.

In a following step 904, the Viewer Application 101 waits for some user action. The Viewer Application 101 is typically implemented as an event driven application, where user actions such as selection of a GUI control are reported to the application asynchronously as events occur. When a user action occurs in a subsequent step 905, then in a following step 906, the Viewer Application 101 processes the user input, and the process 900 returns via an arrow 907 to the step 904.

The Viewer Application 101 thus has an event ioop (comprising the steps 904-906 and the loop 907) which waits for events and dispatches them appropriately. The user action will typically include retrieving recorded video, available video indications, or camera coverage indications from the Storage Server Application 105. The Viewer Application 101 responds to user action by retrieving recorded video, available video indications or camera coverage indications from the Storage server 105. This is described in detail in regard to FIG. 22. After processing the current user input, the Viewer Application 101 waits for more user input.

Figure 21:
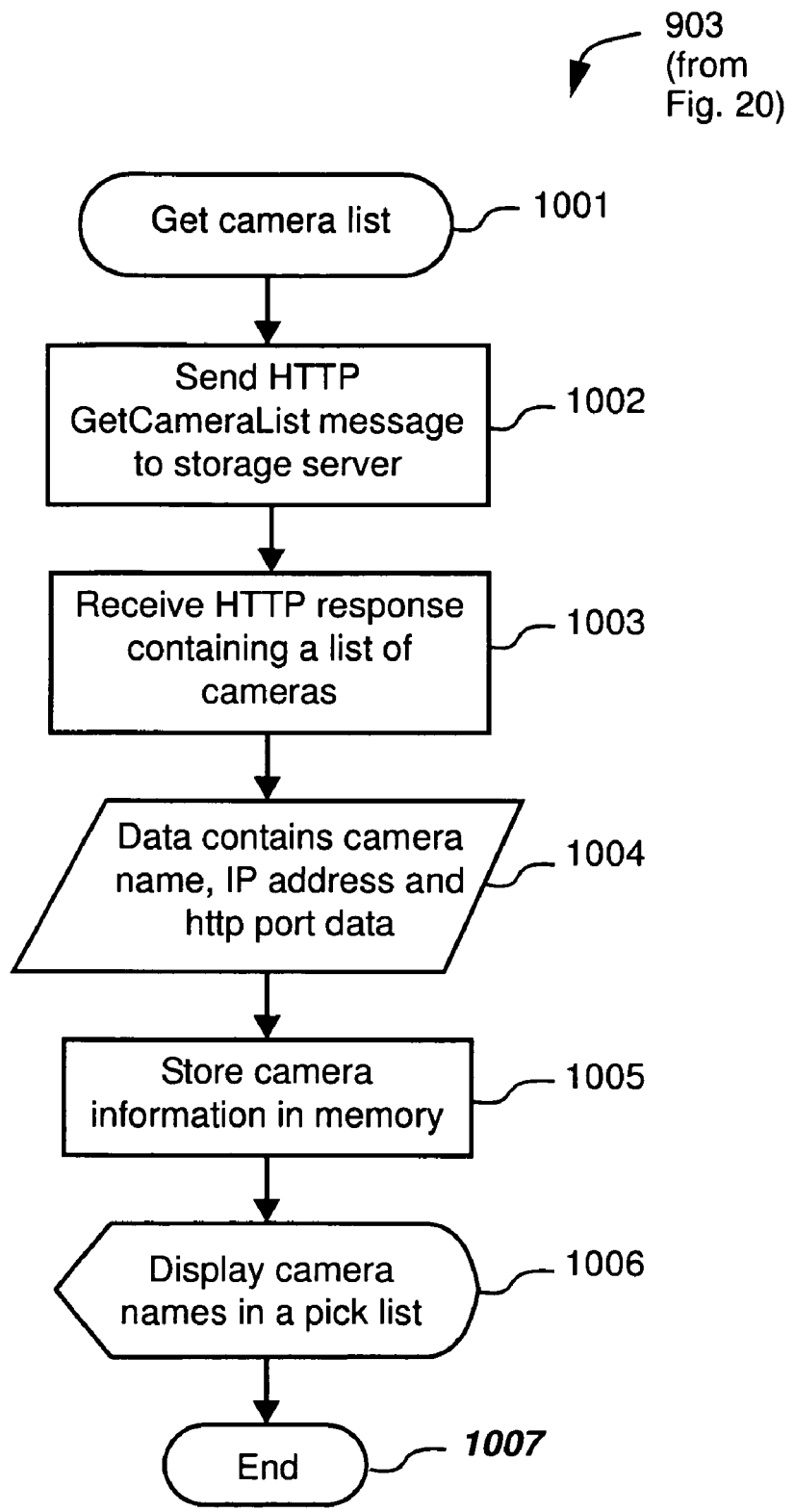
FIG. 21 is a process flowchart for a Viewer Application process for obtaining information about cameras known to the Storage Server application and displaying them, as depicted in FIG. 20.

FIG. 21 is a flowchart of the process 903 in FIG. 20 by which the Viewer Application 101 gets information about cameras known to the Storage Server 105 and display them. A first label 1001 merely depicts the function of the process 903. In a following step 1002 an HTTP connection to the storage server 105 is established by the viewer application 101. The GetCameraList HTTP command is sent to the Storage Server 105 to get the list of cameras from the camera and video database 107. In a following step 1003 the camera list and associated information is returned to the viewer application 101 by the storage server 105 in an HTTP response in plain-text format. As noted in a following step 1004, each line in the body of response typically contains the name of the camera, followed its IP address and port number as depicted in FIG. 4.

These fields are typically separated by a delimiter like the comma character. In a following step 1005, the Viewer Application 101 stores the camera information in the memory 2706, after which in a step 1006, the Viewer Application 101 displays camera names in a pick list 401 in the GUI 400. The process 903 then terminates with an END step 1007.

Figure 22:
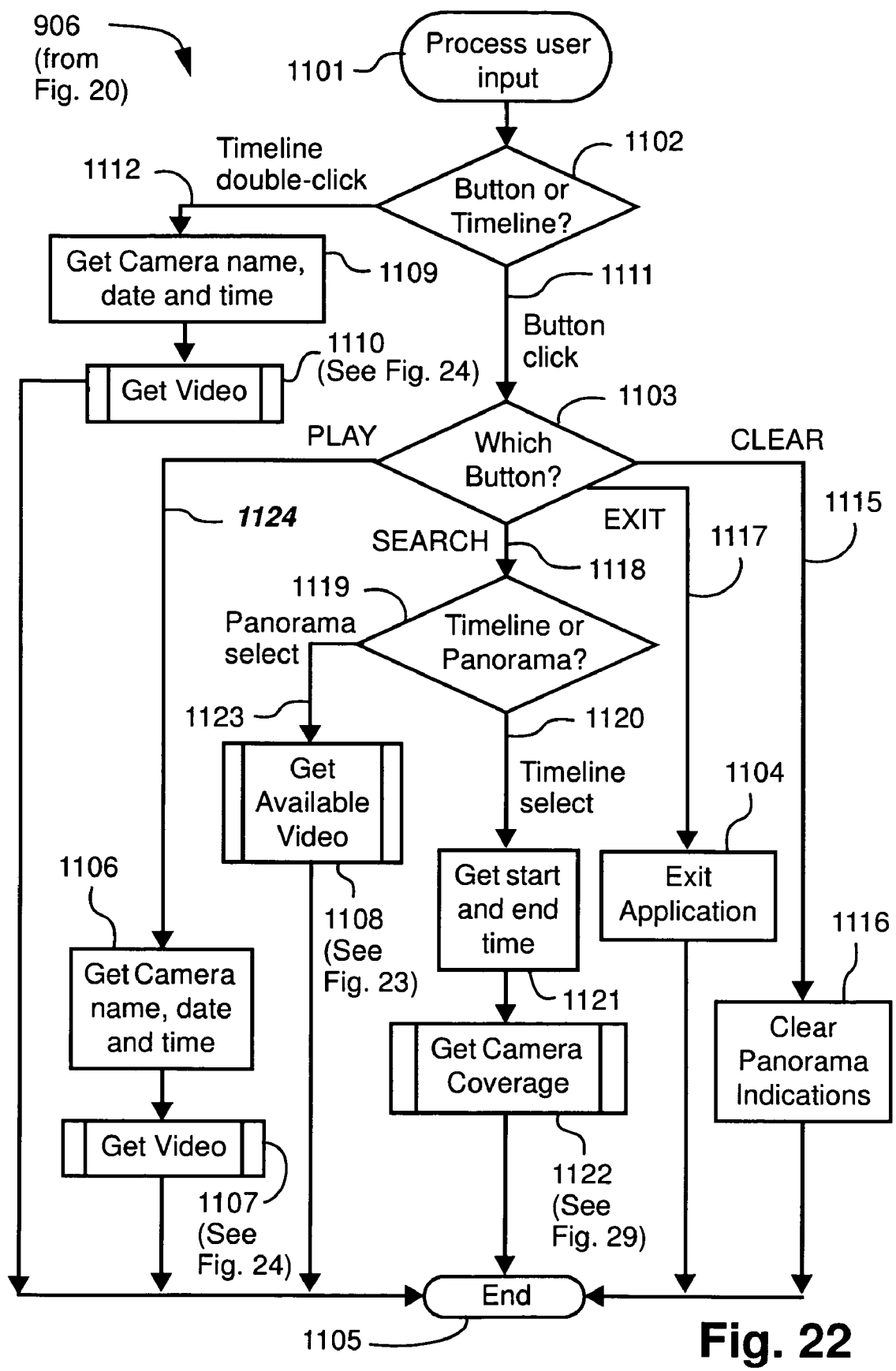
FIG. 22 is a process flowchart for processing user input in the Viewer Application, as depicted in FIG. 20.

FIG. 22 is a flowchart of the process 906 in FIG. 20 for processing user input in the Viewer Application 101. A first statement 1101 states the function of the process 906. In a following step 1102, the Viewer Application 101 acquires and tests all the information entered or selected by the user from its user interface elements as depicted, for example, in FIGS. 14-19. If a "BUTTON" action is detected (this encompassing, for example, the GUI control elements 401, 402, 409, 405-408 in FIG. 14) then the process 906 follows an arrow 1111 from the step 1102 to a step 1103 in which the Viewer Application 101 determines which button control has been operated.

If the PLAY button is pressed, then the process 906 follows a PLAY arrow 1124 to a step 1106 in which the Viewer Application 101 retrieves the camera name, its IP address and port number as well as the start date and time from the respective text boxes in the GUI 400. In a further step 1107, the Viewer Application 101 creates a playback session to get video as described in relation to FIG. 24. The process 906 is then directed to an END step 1105 where the process 906 terminates.

Returning to the step 1103, if the SEARCH button 406 is pressed, then the process 906 follows a SEARCH arrow 1118 to a step 1119 in which the Viewer Application 101 determines whether the user is searching using the timeline or the panorama Window. If panorama window based searching is being used, then the process 906 follows an arrow 1123 to a step 1108 in which the Viewer Application 101 searches for available video as described in relation to FIG. 23. The process 906 is then directed to the END step 1105. Returning to the step 1119, if timeline based searching is being used, then the process 906 follows an arrow 1120 to a step 1121 in which the Viewer Application 101 retrieves the start and end time(s) designated by the user on the timeline e.g., see 3003 in FIG. 19. In a following step 1122 the Viewer Application 101 retrieves the camera coverage in a manner that is described in relation to the process 1122 in FIG. 29. The process 906 is then directed to the END step 1105.

Returning to the step 1103, if the user presses the EXIT button 407, then the process 906 follows an EXIT arrow 1117 to a step 1104 which exits the viewer application 101. The process 906 is then directed to the END step 1105.

Returning to the step 1103, if the CLEAR button 413 in FIG. 14 is pressed then the process 906 follows an arrow 1115 to a step 1116 which clears all indications from the active panorama window and from the timeline. These indications include the trail indications such as 602 in FIG. 16, the available video indication 804 in FIG. 18, and the camera coverage indication 3003 in FIG. 19.

After successful completion of any of the steps 1108, 1107, 1104, 1116 and 1122, the process 906 terminates with an END step 1105.

Returning to the step 1102, if the user double clicks with the mouse 2703 on the timeline 411, then the process 906 follows an arrow 1112 to a step 1109 in which the Viewer Application 101 gets the camera name associated with the active panorama window, and the date and time corresponding to the location where the user double clicked from the timeline. In a following step 1110, the Viewer Application 101 creates a playback session to get video as described in regard to FIG. 24. It is noted that both the steps 1107 and 1110 implement the process described in relation to FIG. 24.

Figure 23:
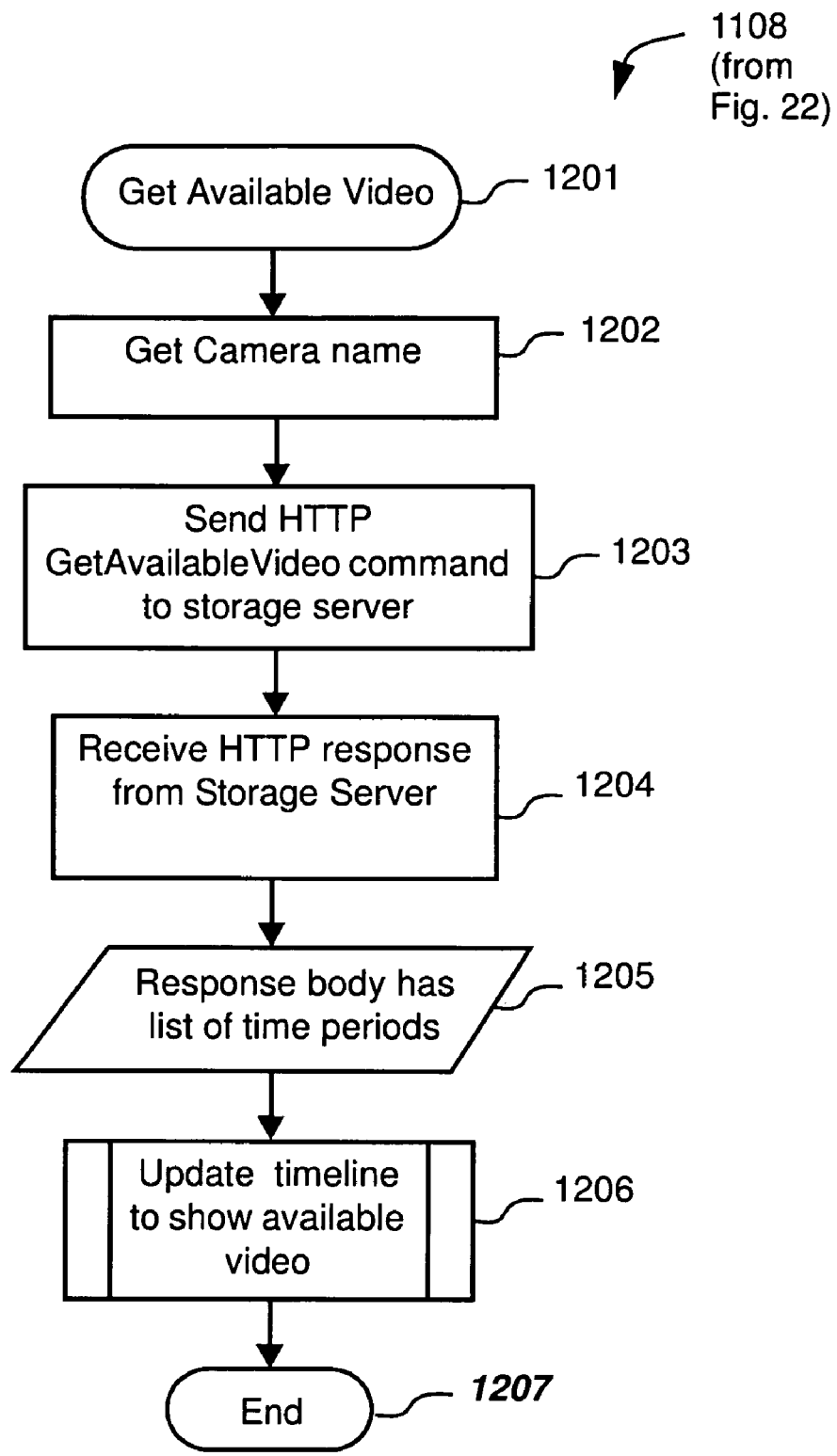
FIG. 23 is a process flowchart for getting the available video indications, as depicted in FIG. 22.

Returning to the step 1102, if an area in the panorama is selected and the SEARCH button is pressed, then the Viewer Application 101 proceeds to doing a search for available video as described in flowchart of FIG. 23.

FIG. 23 is a flowchart of the process 1108 in FIG. 22 for getting the available video indications from the storage server 105. A first statement 1201 states the function of the process 1108. In a following step 1202, the Viewer Application 101 retrieves the camera name from the memory 2706 associated with the Active Panorama Window. The pixel coordinates corresponding to the rectangular region designated by the user on the panorama window (e.g., see 804 in FIG. 18) are retrieved by the Viewer Application 101. These pixel coordinates are transformed into pan and tilt values in the camera coordinate system as described in relation to FIG. 30D which depicts a 2-D transformation matrix 2502 used to convert the pixel coordinates 2501 into camera coordinates 2503 expressed in $\frac{1}{100}^{th}$ degree units.

In a following step 1203 the Viewer Application 101 sends the GetAvailableVideo command to the Storage Server 105 with the camera name and pan and tilt coordinates corresponding to the rectangular region indicated by the user. Thereafter in a step 1204 the Storage Server 105 returns an HTTP response that contains, as set out in a following statement 1205, time ranges which indicate video available for that camera when the camera was in the region the user specified earlier. In a subsequent step 1206 the Viewer Application 101 updates the timeline to indicate available video as one or more rectangular regions spanning across the timeline in the bottom half of the timeline using the time periods returned in the HTTP response (see 807-809 in FIG. 18). The process 1108 then terminates with an END step 1207.

Figure 24:
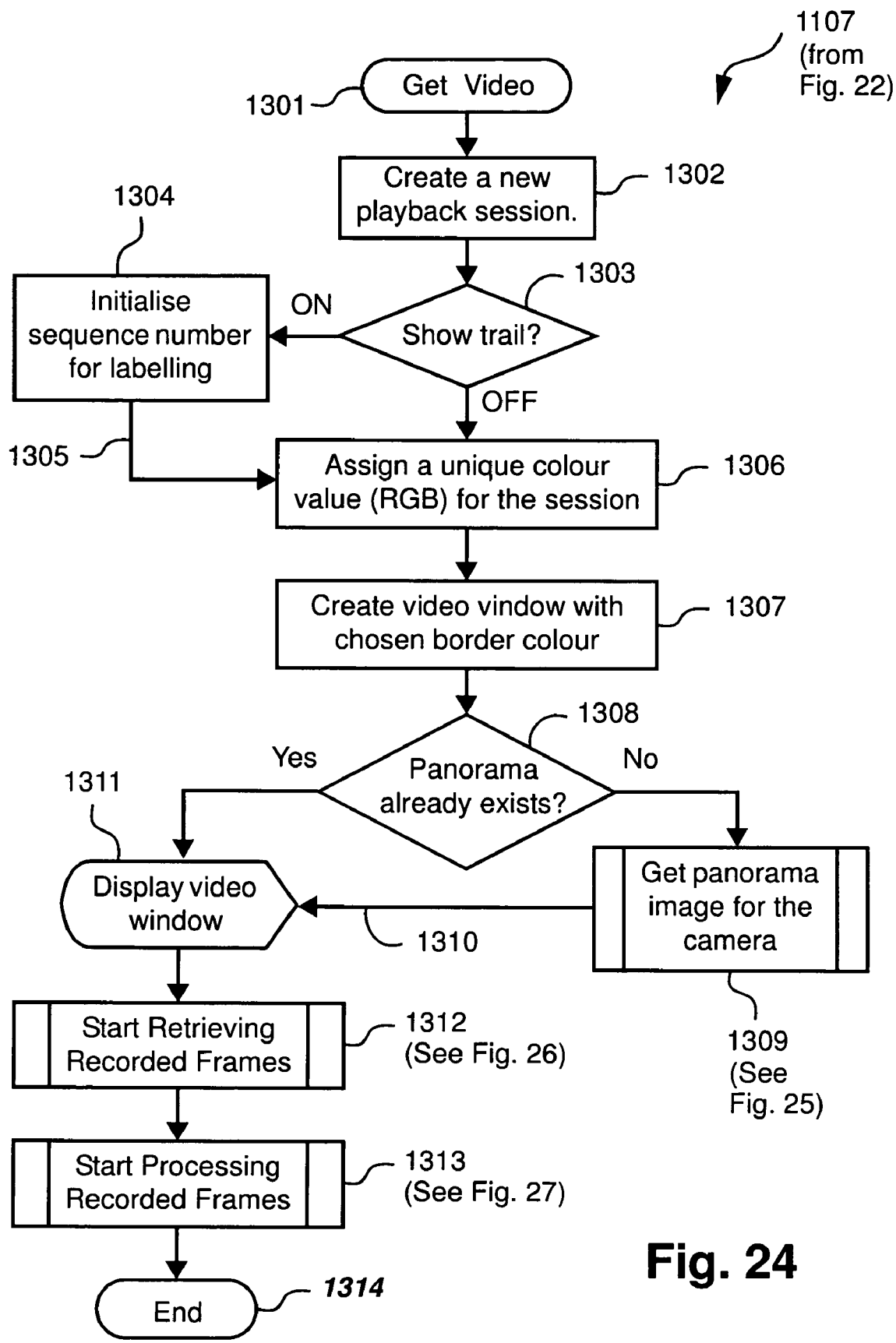
FIG. 24 is a process flowchart for creating a playback session for getting video and displaying it, as depicted in FIG. 22.

FIG. 24 is a flowchart for the process 1107 in FIG. 22 by which the Viewer Application 101 creates a playback session for getting video and displaying it when either the "PLAY" button is clicked or the user double clicks on the timeline in an area which indicates available video. The process 1107 commences with a statement 1301 setting out the function of the process. In a following step 1302 the Viewer Application 101 creates a Playback session object with the information about the camera and start date and time retrieved in the step 1106 in FIG. 22. In a following step 1303, if the "Show Trail" option (eg 408 in FIG. 14) was turned on, then the process 1107 follows a YES arrow to a step 1304 in which the Viewer Application 101 initialises a sequence number for the playback session, and typically sets the number to a value of "1". In a following step 1306, the Viewer Application 101 assigns a unique RGB colour value which, in a following step 1307, is used to paint a border (e.g., 504 or 507 in FIG. 15) around the video window, as well as to draw rectangular regions (e.g., 502, 506 in FIG. 15) on the panorama image (505 in FIG. 15) and on the timeline (511 in FIG. 15).

A following step 1308 determines if a panorama window already exists. If this is not the case then the process 1107 follows a NO arrow to a step 1309 in which the Viewer Application 101 retrieves and displays the panorama window, as described in relation to FIG. 25. In a following step 1311, the Viewer Application 101 creates a new video window for showing recorded video for the selected camera. The video window for displaying recorded frames is displayed with the chosen border colour. In a following step 1312, the Viewer Application 101 starts retrieving frames from the Storage Server 105 as described in relation to FIG. 26. Thereafter in a step 1313, the Viewer Application 101 processes the received frames and displays them as described in relation to FIG. 27.

Returning to the step 1308, if a panorama window does exist, then the process 1107 follows a YES arrow to the step 1311.

Figure 25:
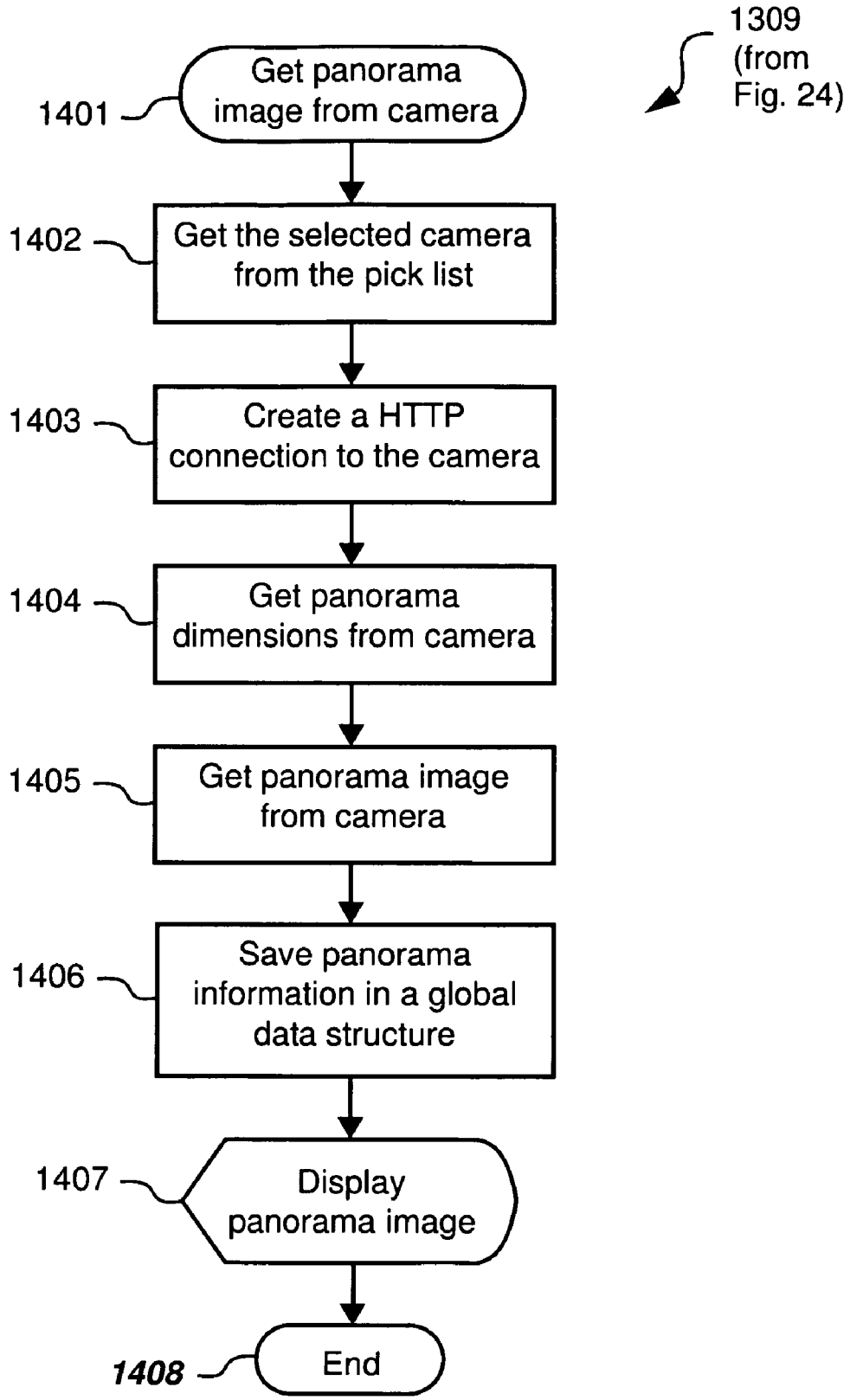
FIG. 25 is a process flowchart for getting a panorama image and associated information from the camera, as depicted in FIG. 24.

FIG. 25 is a flowchart of the process 1309 from FIG. 24 for getting a panorama image and associated information from the camera. A first statement 1401 sets out the function of the process 1309, after which in a step 1402 the Viewer Application 101 retrieves the camera IP address and port number for the selected camera in the pick list. In a following step 1403 the Viewer Application 101 establishes an HTTP connection to the camera 103 using the camera IP address and port number. Thereafter in a step 1404 the Viewer Application 101 retrieves the dimensions of the panorama window from the camera 103 using the GetPanoramainfo HTTP command. The main items of interest are the pan_left, pan_right, pan_width, pan_height, image_width and image_height fields. A sample response from the camera containing these fields is shown in FIG. 12A. In a following step 1405, the Viewer Application 101 retrieves the panorama image itself from the camera 103 using the GetPanoramaImage command. A sample response from the camera containing a panorama image is shown in FIG. 12B. In a subsequent step 1406, the Viewer Application 101 saves the panorama image and associated information in a global data structure in the memory 2706 in FIG. 2. In a following step 1407, the Viewer Application 101 displays the panorama image, after which the process 1309 terminates in an END step 1409.

Figure 26:
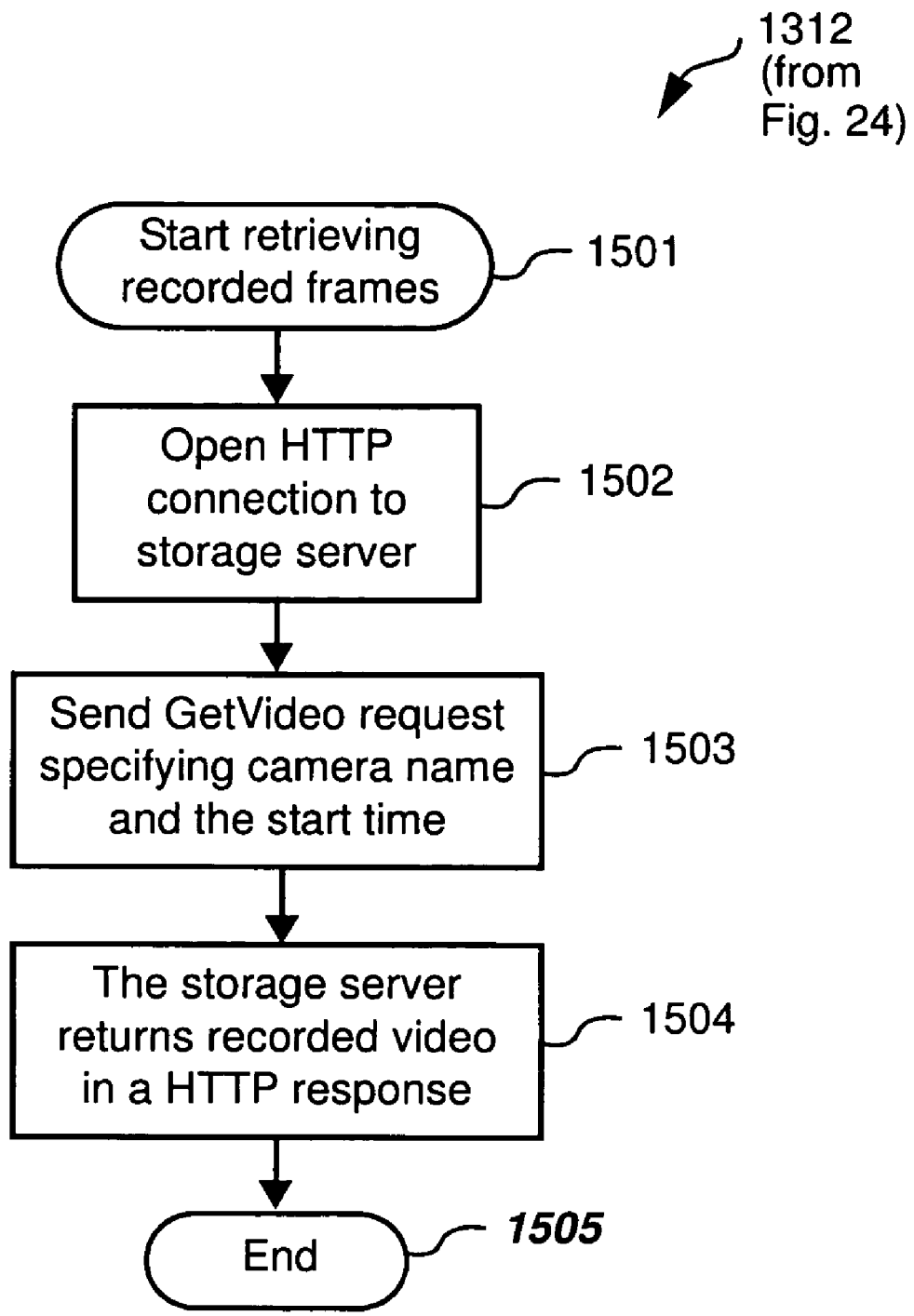
FIG. 26 is a process flowchart for setting up communication with a storage server application to start getting recorded frames, as depicted in FIG. 24.

FIG. 26 is a flowchart of the process 1312 from FIG. 24 by which the Viewer Application 101 sets up the necessary communication with the storage server 105 to start getting recorded frames. A first statement 1501 sets out the function of the process 1312, after which in a step 1502 the Viewer Application 101 establishes an HTTP connection to the storage server 105. In a following step, the Viewer Application 101 sends a GetVideo HTTP command to the Storage Server 105 to get the recorded video. The parameters to the GetVideo are extracted from the user interface and they are: camera name, start date and start time. The recorded video is returned by the storage server 105 in an HTTP response message as multi-part data to the Viewer Application 101. Retrieving of video is typically handled in a separate thread which enables the end-user perform other actions concurrently while the recorded video is retrieved and displayed.

Figure 27:
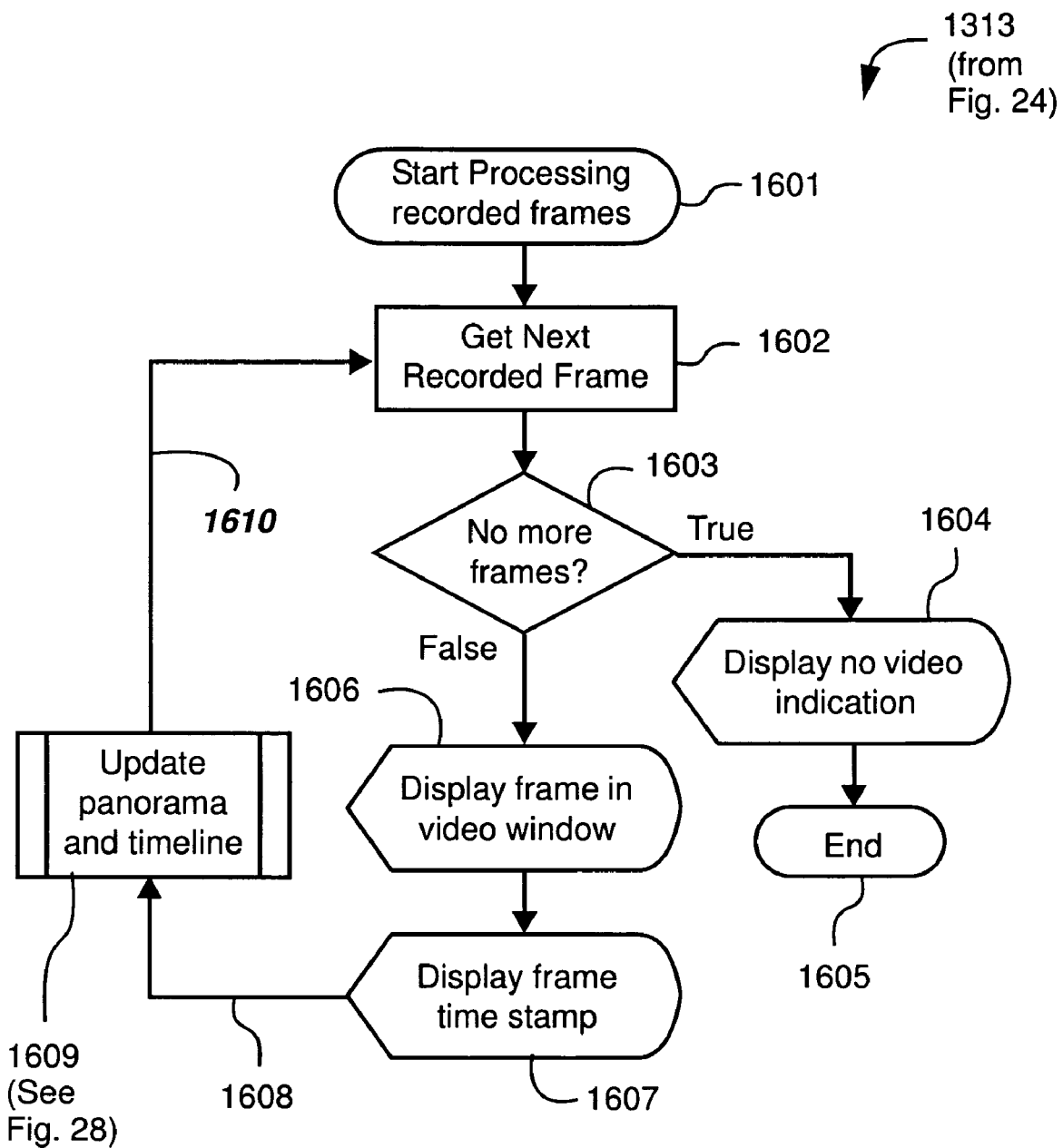
FIG. 27 is a process flowchart for displaying and processing recorded frames as they are received from the storage server application, as depicted in FIG. 24.

FIG. 27 is a flowchart of the process 1313 from FIG. 24 by which the Viewer Application 101 displays and processes recorded frames as they are received from the storage server 105. A first statement sets out the function of the process 1313. A following step 1602 gets the next recorded frame after which a test step 1603 determines if there are any more frames. if this is the case then the process 1313 follows a FALSE arrow to a step 1606 which displays the frame in a video window. A following step 1607 displays the time stamp in the video window, after which the process 1313 follows an arrow 1608 to a step 1609 which updates the panorama window and the timeline. The process 1313 is then directed by an arrow 1610 back to the step 1602. Returning to the step 1603, if there are no more frames, then the process 1313 follows a TRUE arrow to a step 1604 which displays NO ViDEO indication, after which the process 1313 ends with an END step 1605.

The received video frames are thus processed one frame at a time till there are no more frames to be processed. Each frame is displayed in the video window one after another in the order they are received. Along with the display of the video frame, the timestamp associated with the video frame which represents the time of capture of the frame from the camera is also displayed. The camera position indication is continually updated in the panorama window and the timeline is also updated if necessary. Details of how the panorama and timeline are updated are described in relation to FIG. 28.

Figure 28:
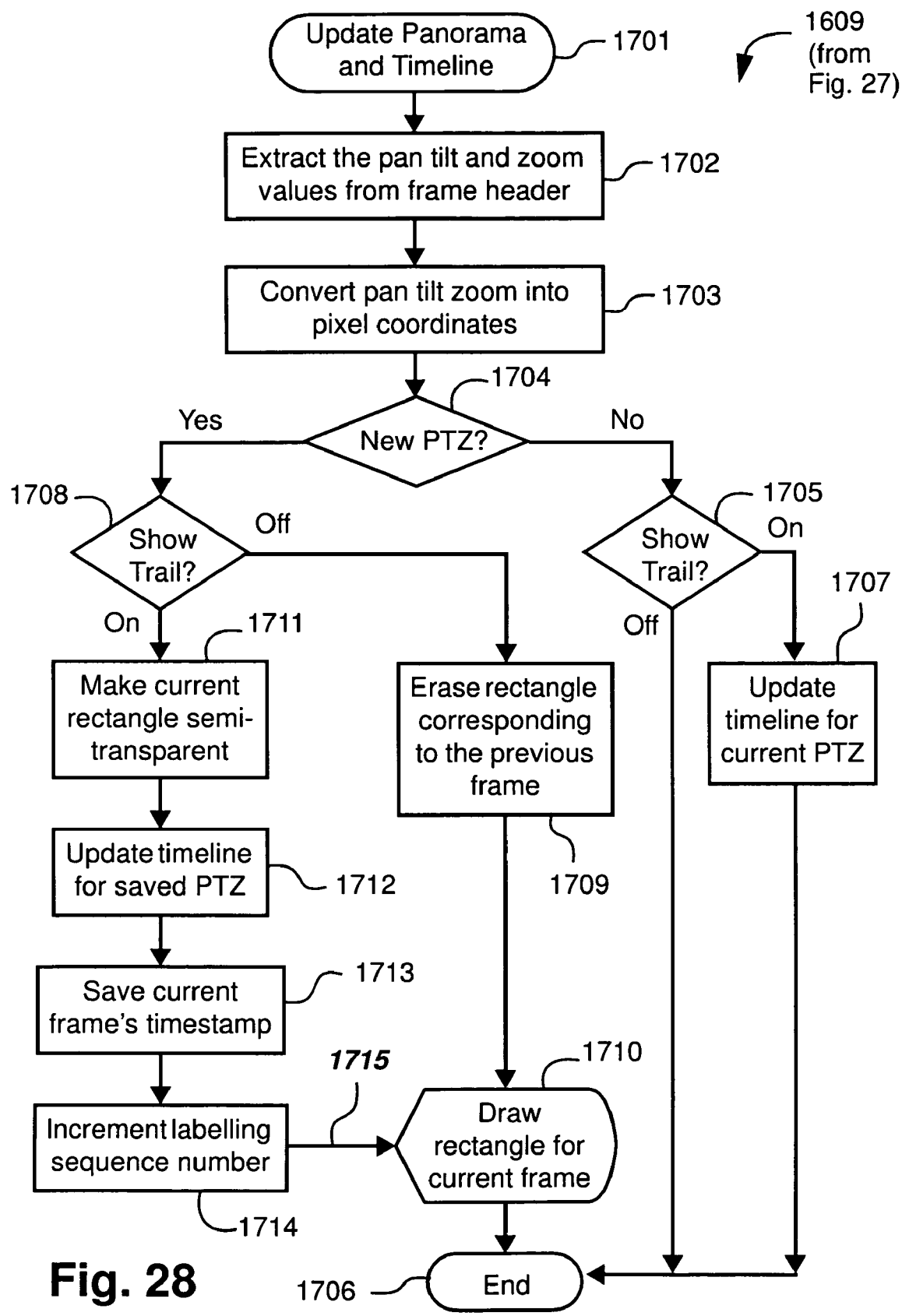
FIG. 28 is a process flowchart for processing a single recorded video frame to visualise camera position and/or movement and update the timeline, as depicted in FIG. 27.

FIG. 28 is a flowchart of the process 1609 from FIG. 27 for processing a single recorded video frame and consequently presenting camera position on the panorama window and/or updating the timeline. A first statement 1701 sets out the function of the process 1609, after which in a step 1702 the viewer application 101 extracts the pan, tilt and zoom parameters from the header of the recorded frame received from the storage server 105. In a following step 1703 the pan, tilt and zoom values 2505 (see FIG. 30C) are converted by the viewer application 101 to pixel coordinates 2504 (see FIG. 30C) suitable for drawing a rectangular region on the panorama using the transformation matrix 2506 described in FIG. 30C. A following step 1704 determines if any of the pan, tilt and zoom values have changed. If the pan, tilt and zoom values are unchanged from the previous frame, then the process 1609 follows a NO arrow to a step 1705 since no further update of the panorama is required. The step 1705 determines if the "show trail" option (see 408 in FIG. 14) has been selected. If the "Show Trail" option is on for the playback session, then the process 1609 follows an ON arrow to a step 1707 in which the time period indication for the current camera position is updated to include the current frame's timestamp. The process 1609 then is directed to an END step 1706. Returning to the step 1705, if the "show trail" function is not being used, then the process 1609 is directed to the END step 1706.

Returning to the step 1704, if the pan, tilt and zoom values are different from the previous frame, then the process 1609 follows a YES arrow to a step 1708 which determines if the show trail function is active. If "Show Trail" is on for the playback session, then the process 1609 follows an ON arrow to a step 1711 which changes the rectangle corresponding to the pan, tilt and zoom settings of the previous frame into a semi-transparent rectangular region which is labelled with the current value of the sequence number for the session.

In a following step 1712, the timeline is also updated to indicate a rectangular region with the same sequence number label to show the time period the camera was in the previous position. The time period is determined by using the saved timestamp corresponding to the first frame in the previous camera position and the previous frame's timestamp which happens to be the last frame in the previous camera position. The semi-transparent rectangular regions drawn previously to this one are made progressively more transparent. If a region becomes fully transparent and hence invisible, the corresponding indication on the timeline erased.

In a following step 1713, the timestamp for the current frame is saved and later used to draw the rectangle in the timeline. A subsequent step 1714 increments the sequence number for the session by 1. Returning to the step 1708, if the "Show trail" option is off for the playback session, then the process 1609 follows an OFF arrow to a step 1709 in which the rectangle corresponding to the pan, tilt and zoom settings of the previous frame is erased. Thereafter in a step 1710 a new rectangle is drawn corresponding to pan, tilt and zoom values of current recorded frame. Alternatively, the rectangle indication on the panorama rather than being just the current camera position, could be implemented as some function (such as union or average) of the last few distinct camera positions. The process 1609 then terminates at the END step 1706. Returning to the step 1714, after the sequence number is incremented, the process is directed to the step 1710.

Figure 29:
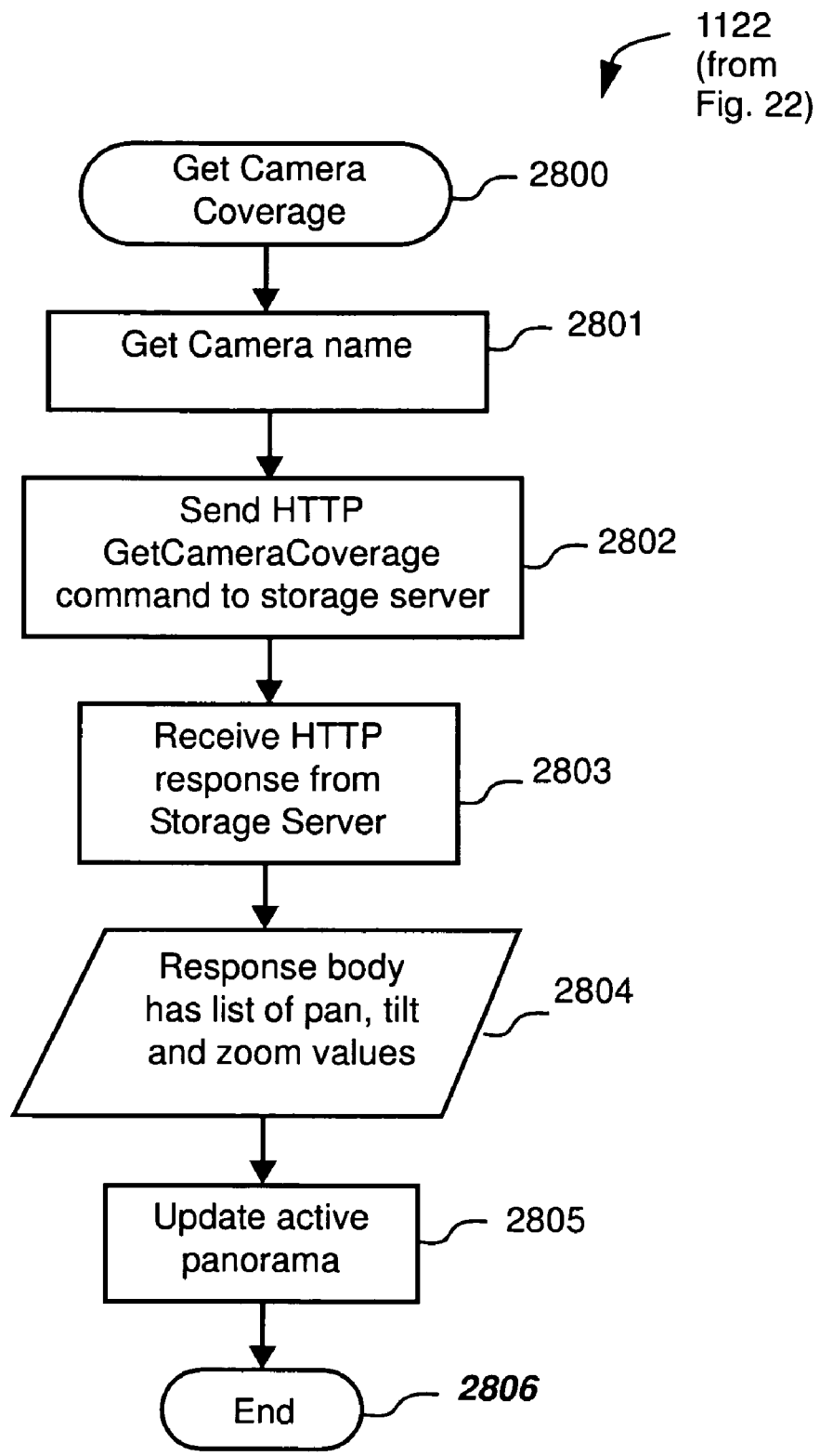
FIG. 29 is a process flowchart for the getting camera coverage indications in the Viewer application in FIG. 22.

FIG. 29 is a flowchart of the process 1122 from FIG. 22 for the getting camera coverage indications by the Viewer Application 101. The process 1122 commences with a step 2800 in which the Viewer Application 101 calls the process 1122 in FIG. 22. In a following step 2801, the Viewer Application 101 retrieves both the camera name associated with the Active Panorama Window and the time period corresponding to the rectangular region specified on the timeline. In a following step 2802, the Viewer Application 101 sends a corresponding GetCameraCoverage command to the Storage Server 105 with the camera name and time period corresponding to the rectangular region indicated by the user on the timeline.

The Storage Server 105 returns, in a subsequent step 2804, an HTTP response that contains pan, tilt and zoom values indicating the various positions the camera was in during the specified period. In a following step 2805, the Viewer Application 101 updates the panorama window to show rectangular regions indicating camera position using the pan, tilt and zoom values returned in the response. The pan, tilt and zoom values are in camera coordinates specified in $1/100^{th}$ degree units and they are converted to pixel coordinates using the transformation matrix in FIG. 30C before being displayed. The process 1114 then terminates with an END step 2806.

FIGS. 30A-30D show the camera coordinate system in $1/100^{th}$ degree units, the panorama image coordinate system and simple 2-D transformation matrices to convert points in one system to another and vice-versa.

The pan and tilt settings extracted from the JPEG header of the recorded video frame are in Camera coordinate system which is expressed in $1/100^{th}$ degree units.

FIG. 30A shows the camera co-ordinate system. The bounds of this coordinate system are retrieved using the GetPanoramaInfo command (see FIG. 12A). These coordinates must be converted into pixel units of the panorama image co-ordinate system which is shown in FIG. 30B.

FIG. 30C shows the 2-D transformation from the camera coordinate system to the panorama image coordinate system.

FIG. 30D shows the 2-D transformation from the panorama's pixel coordinate system to the camera coordinate system. The variables $D_x$, $D_y$, $S_x$ and $S_y$ are computed from the data extracted from the GetPanoramaInfo response message as given below.

$$Dx:=-\text{pano\_left}, Dy:=-\text{pano\_top}$$

$$Sx:=\text{image\_width}/\text{pano\_width}, Sy:=-\text{image\_height}/\text{pano\_height}$$

When this transformation matrix is applied to pan and tilt values extracted from the header, the corresponding center of the rectangular region in pixel coordinates is obtained. The width and height of the rectangle are determined as follows.

$$\text{image\_aspect\_ratio}=\text{image\_width}/\text{image\_height}$$

$$\text{rectangle\_width}:=\text{frame\_zoom}*Sx$$

$$\text{rectangle\_height}:=\text{rectangle\_width}/\text{image\_aspect\_ratio}$$

INDUSTRIAL APPLICABILITY

It is apparent from the above that the arrangements described are applicable to the image processing and surveillance industries.

The foregoing describes only some embodiments of the present invention, and modifications and/or changes can be made thereto without departing from the scope and spirit of the invention, the embodiments being illustrative and not restrictive.

The aforementioned preferred viewpoint visualization method(s) comprise a particular control flow. There are many other variants of the preferred viewpoint visualization method(s) which use different control flows without departing the spirit or scope of the invention. Furthermore one or more of the steps of the preferred method(s) may be performed in parallel rather sequential.

The claims defining the invention are as follows:

1. A method for displaying one of a plurality of images stored in a storage server, the images captured by a controllable camera, the method comprising the steps of:
   constructing a representation of a field of view accessible by the camera;
   retrieving, from the storage server, the stored image and a plurality of parameters characterizing a plurality of control states of the camera when the image was captured; and
   displaying: (a) the retrieved image; (b) the representation; and (c) an indicator on the representation dependent upon the parameters,
   wherein the method displays a video clip comprising sub-clips of the stored images,
   wherein the displaying step comprises, for successive sub-clips of the video clip, the steps of displaying: (1) the sub-clip, and (2) an indicator on the representation dependent upon parameters associated with the sub-clip, and
   wherein for each successive sub-clip in the video clip, the indicator associated with the sub-clip is displayed for a time period after the sub-clip ceases to be displayed.

2. A method according to claim 1, wherein the representation of the field of view accessible by the camera is determined by the camera.

3. A method according to claim 2, wherein the determination of the representation of the field of view comprises the steps of:
   capturing a set of images covering the field of view; and
   combining the set of images to form the representation of the field of view.

4. A method according to claim 1, wherein the control states of the camera comprise, associated with the stored image, a camera identifier, a time of capture, a pan attribute, a tilt attribute, and a zoom attribute.

5. A method according to claim 1, further comprising the step of displaying:
   a video clip of the stored images; and
   an indicator on the representation dependent upon a plurality of parameters associated with the video clip.

6. A method according to claim 5, for further displaying a second video clip of a second set of stored images captured by a second controllable camera, the method comprising the further steps of:
   constructing a second representation of a field of view accessible by the second camera;
   retrieving, from a memory, the second set of stored images and a plurality of parameters, associated with the second set of images, characterizing a plurality of states of the second camera when the second set of images were captured; and
   for the second video clip, displaying:
   (1) the retrieved second set of images;
   (2) the second representation; and
   (3) an indicator on the second representation dependent upon the plurality of parameters associated with the second set of stored images.

7. A method according to claim 6, wherein the representation of the field of view accessible by the camera and the representation of the field of view accessible by the second camera are combined into a composite representation upon which is displayed:

(1) the video clip of images;
(2) the indicator dependent upon the plurality of parameters associated with the video clip of the images;
(3) the second video clip of the second set of stored images; and
(4) the indicator dependent upon the plurality of parameters associated with the second video clip.

8. A method according to claim 5, comprising further steps of:
    displaying, on a timeline representation, a time interval during which at least one stored image was captured;
    designating a time interval on the timeline representation; and
    searching the stored images for at least one image associated with the designated time interval.

9. A method according to claim 8, comprising a further step of:
    presenting, on the representation of the field of view, the parameters characterizing the control states of the camera during the designated time interval.

10. A method according to claim 9, comprising a further step of:
    designating the representation of the field of view to display the image associated with the designated time interval.

11. A method according to claim 1, further comprising the steps of:
    displaying, on a timeline representation, a time interval during which at least one stored image was captured; and
    displaying, on the timeline representation, a time interval associated with the indicator being displayed.

12. A method according to claim 11, wherein the displayed time interval representation associated with each indicator being displayed shows a display identifier.

13. A method according to claim 11, comprising the further steps of:
    designating a region on the representation of the field of view; and
    searching the stored images for at least one image which at least partially covers the designated region.

14. A method according to claim 13, comprising a further step of:
    representing, on the timeline representation, a time interval during which the image which at least partially covers the designated region was captured.

15. A method according to claim 14, comprising a further step of:
    designating the timeline representation to display the image which at least partially covers the designated region.

16. An apparatus for displaying one of a plurality of images stored in a storage server, the images captured by a controllable camera, the apparatus comprising:
    a storage server storing the plurality of images;
    means for constructing a representation of a field of view accessible by the camera;
    means for retrieving, from the memory, the stored image and a plurality of parameters characterizing a plurality of control states of the camera when the image was captured; and
    means for displaying: (a) the retrieved image; (b) the representation; and (c) an indicator on the representation dependent upon the parameters,
    wherein the means for displaying displays a video clip comprising sub-clips of the stored images,
    wherein the displaying comprises, for successive sub-clips of the video clip, the steps of displaying: (1) the sub-clip, and (2) an indicator on the representation dependent upon parameters associated with the sub-clip, and
    wherein for each successive sub-clip in the video clip, the indicator associated with the sub-clip is displayed for a time period after the sub-clip ceases to be displayed.

17. An apparatus according to claim 16, further comprising means for displaying:
    a video clip of the stored images; and
    an indicator on the representation dependent upon a plurality of parameters associated with the video clip.

18. An apparatus for displaying one of a plurality of images stored in a storage server, the images captured by a controllable camera, the apparatus comprising:
    a memory for storing a program; and
    a processor for executing the program, said program comprising:
    (1) code for constructing a representation of a field of view accessible by the camera;
    (2) code for retrieving, from a memory, the stored image and a plurality of parameters characterizing a plurality of control states of the camera when the image was captured; and
    (3) code for displaying: (a) the retrieved image; (b) the representation; and (c) an indicator on the representation dependent upon the parameters,
    wherein the code for displaying displays a video clip comprising sub-clips of the stored images,
    wherein the displaying comprises, for successive sub-clips of the video clip, the steps of displaying: (1) the sub-clip, and (2) an indicator on the representation dependent upon parameters associated with the sub-clip, and
    wherein for each successive sub-clip in the video clip, the indicator associated with the sub-clip is displayed for a time period after the sub-clip ceases to be displayed.

19. A computer-readable storage medium having recorded thereon a computer program for directing a processor to execute a method for displaying one of a plurality of images stored by a storage server, the images captured by a controllable camera, said program comprising:
    code for constructing a representation of a field of view accessible by the camera;
    code for retrieving, from a memory, the stored image and a plurality of parameters characterizing a plurality of control states of the camera when the image was captured; and
    code for displaying: (a) the retrieved image; (b) the representation; and (c) an indicator on the representation dependent upon the parameters,
    wherein the code for displaying displays a video clip comprising sub-clips of the stored images,
    wherein the displaying comprises, for successive sub-clips of the video clip, the steps of displaying: (1) the sub-clip, and (2) an indicator on the representation dependent upon parameters associated with the sub-clip, and
    wherein for each successive sub-clip in the video clip, the indicator associated with the sub-clip is displayed for a time period after the sub-clip ceases to be displayed.

20. A computer-readable storage medium having recorded thereon a computer program for directing a computer to execute a method for displaying one of a plurality of images stored on a storage server, the images captured by a controllable camera, said program comprising:
    code for constructing a representation of a field of view accessible by the camera;

code for retrieving, from a memory, the stored image and a plurality of parameters characterizing a plurality of control states of the camera when the image was captured; and code for displaying: (a) the retrieved image; (b) the representation; and (c) an indicator on the representation dependent upon the parameters, wherein the code for displaying displays a video clip comprising sub-clips of the stored images, wherein the displaying comprises, for successive sub-clips of the video clip, the steps of displaying: (1) the sub-clip, and (2) an indicator on the representation dependent upon parameters associated with the sub-clip, and wherein for each successive sub-clip in the video clip, the indicator associated with the sub-clip is displayed for a time period after the sub-clip ceases to be displayed.

* * * * *